United States Patent [19]
Young et al.

[11] Patent Number: 5,838,127
[45] Date of Patent: *Nov. 17, 1998

[54] SINGLE PHASE MOTOR FOR LAUNDERING APPARATUS

[75] Inventors: Glen C. Young; Brian L. Beifus; Robert K. Hollenbeck, all of Fort Wayne, Ind.; Austars R. Schnore, Scotia, N.Y.; Charles M. Stephens, Pattersonville, N.Y.; Paul M. Szczesny, Ballston, N.Y.; Thomas M. Jahns, Schenectady, N.Y.; Eric R. Benedict, Madison, Wis.

[73] Assignee: General Electric Company, Fort Wayne, Ind.

[*] Notice: This patent issued on a continued prosecution application filed under 37 CFR 1.53(d), and is subject to the twenty year patent term provisions of 35 U.S.C. 154(a)(2).

[21] Appl. No.: 760,470

[22] Filed: Dec. 5, 1996

[51] Int. Cl.$^6$ ................................. H02P 1/22; H02P 6/08; D06F 39/14

[52] U.S. Cl. ........................ 318/293; 318/254; 318/375; 318/119; 318/126; 318/281; 318/283; 68/12.26

[58] Field of Search ..................................... 318/138, 254, 318/293, 296, 299, 375, 379, 380, 439, 759, 800, 801, 432, 484, 119, 126, 127, 700, 721, 722, 281, 283; 68/12.01, 12.02, 12.16, 12.26

[56] References Cited

U.S. PATENT DOCUMENTS

| Re. 33,655 | 8/1991 | Hershberger | 68/23.7 |
|---|---|---|---|
| 3,134,385 | 5/1964 | Cushing | 134/58 |
| 4,250,435 | 2/1981 | Alley et al. | 318/138 |
| 4,313,076 | 1/1982 | Rathje | 318/790 |
| 4,319,171 | 3/1982 | Motoori | 318/379 |
| 4,455,513 | 6/1984 | Fulton et al. | 318/138 |
| 4,527,103 | 7/1985 | Kade | 318/293 |
| 4,545,004 | 10/1985 | Kade et al. | 363/63 |
| 4,626,755 | 12/1986 | Butcher et al. | 318/473 |
| 4,635,349 | 1/1987 | Rabe | 29/596 |
| 4,644,233 | 2/1987 | Suzuki | 318/254 |
| 4,704,567 | 11/1987 | Suzuki et al. | 318/254 |
| 4,724,678 | 2/1988 | Pohl | 62/80 |
| 4,730,152 | 3/1988 | Foust et al. | 318/603 |
| 4,757,241 | 7/1988 | Young | 318/254 |
| 4,757,603 | 7/1988 | Stokes | 29/598 |
| 4,816,726 | 3/1989 | Novis et al. | 318/293 |
| 4,933,584 | 6/1990 | Harms et al. | 310/162 |

(List continued on next page.)

FOREIGN PATENT DOCUMENTS

| 0038694A1 | 4/1981 | European Pat. Off. | H02P 6/02 |
|---|---|---|---|
| 0742637A1 | 5/1996 | European Pat. Off. | H02P 3/22 |

*Primary Examiner*—Bentsu Ro
*Attorney, Agent, or Firm*—Enrique J. Mora

[57] ABSTRACT

A motor system having a stationary assembly including a winding and a rotatable assembly in magnetic coupling relation to the stationary assembly. A power supply link having upper and lower rails supplied by a power supply provides power to the motor winding. The power supply link has power switches responsive to a motor control signal for selectively connecting the rails to the winding to energize the winding with a motor current whereby an electromagnetic field is produced for rotating the rotatable assembly. The power switches include a set of upper power switches and a set of lower power switches. Each of the power switches has a conducting state and a nonconducting state. The system includes a disable circuit for selectively generating a disable signal and a control circuit for generating the motor control signal to control the power switches. The control circuit is responsive to the disable signal for controlling the power switches so that the lower power switches become conducting and the upper power switches become nonconducting, or vice-versa, thereby de-energizing the winding to disable the motor. Other features are also disclosed including circuitry for commutating the motor in advance of zero crossings of the back electromotive force, correcting asymmetries in the commutation intervals and reversing the motor.

41 Claims, 26 Drawing Sheets

U.S. PATENT DOCUMENTS

| | | | |
|---|---|---|---|
| 5,017,852 | 5/1991 | Nagata et al. | 318/727 |
| 5,057,733 | 10/1991 | Sonoda et al. | 310/269 |
| 5,140,243 | 8/1992 | Lyons et al. | 318/701 |
| 5,280,423 | 1/1994 | Imai et al. | 364/140 |
| 5,376,866 | 12/1994 | Erdman | 318/138 |
| 5,418,438 | 5/1995 | Hollenbeck | 318/432 |
| 5,423,192 | 6/1995 | Young et al. | 62/228 |
| 5,465,019 | 11/1995 | Kliman | 310/156 |
| 5,483,139 | 1/1996 | Welles, II | 318/782 |
| 5,492,273 | 2/1996 | Shah | 236/44 A |
| 5,513,058 | 4/1996 | Hollenbeck | 361/36 |

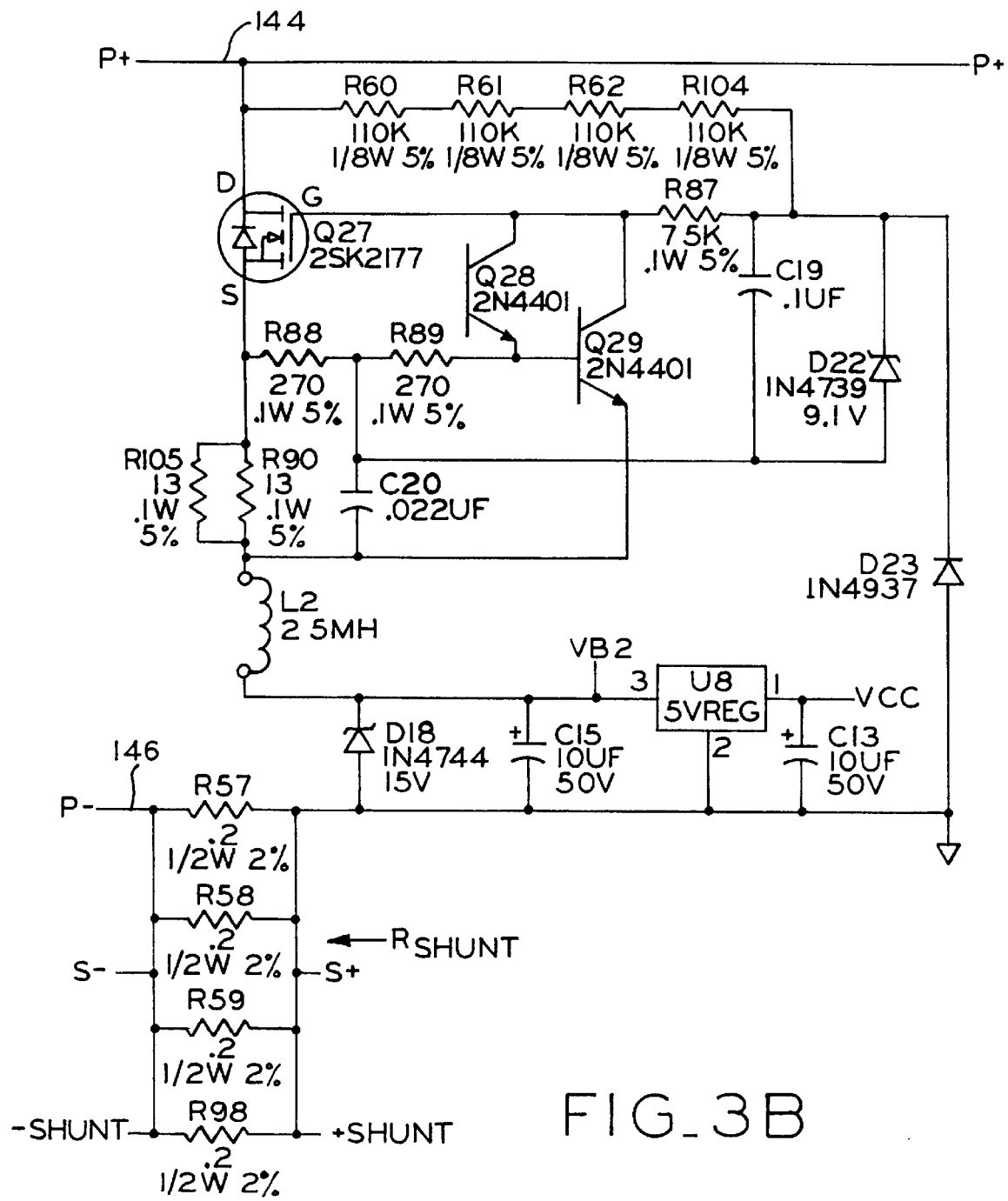
FIG_3B

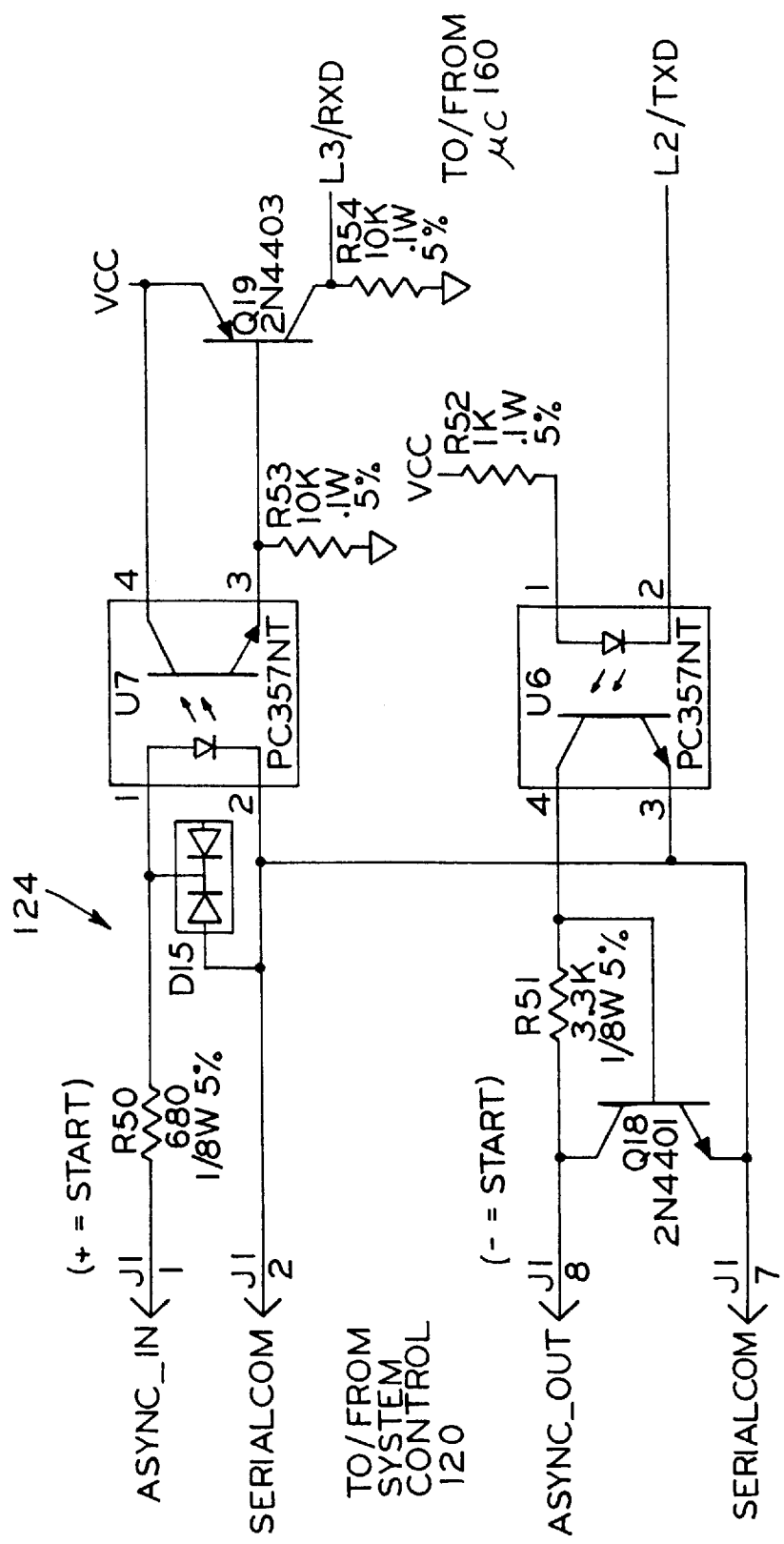

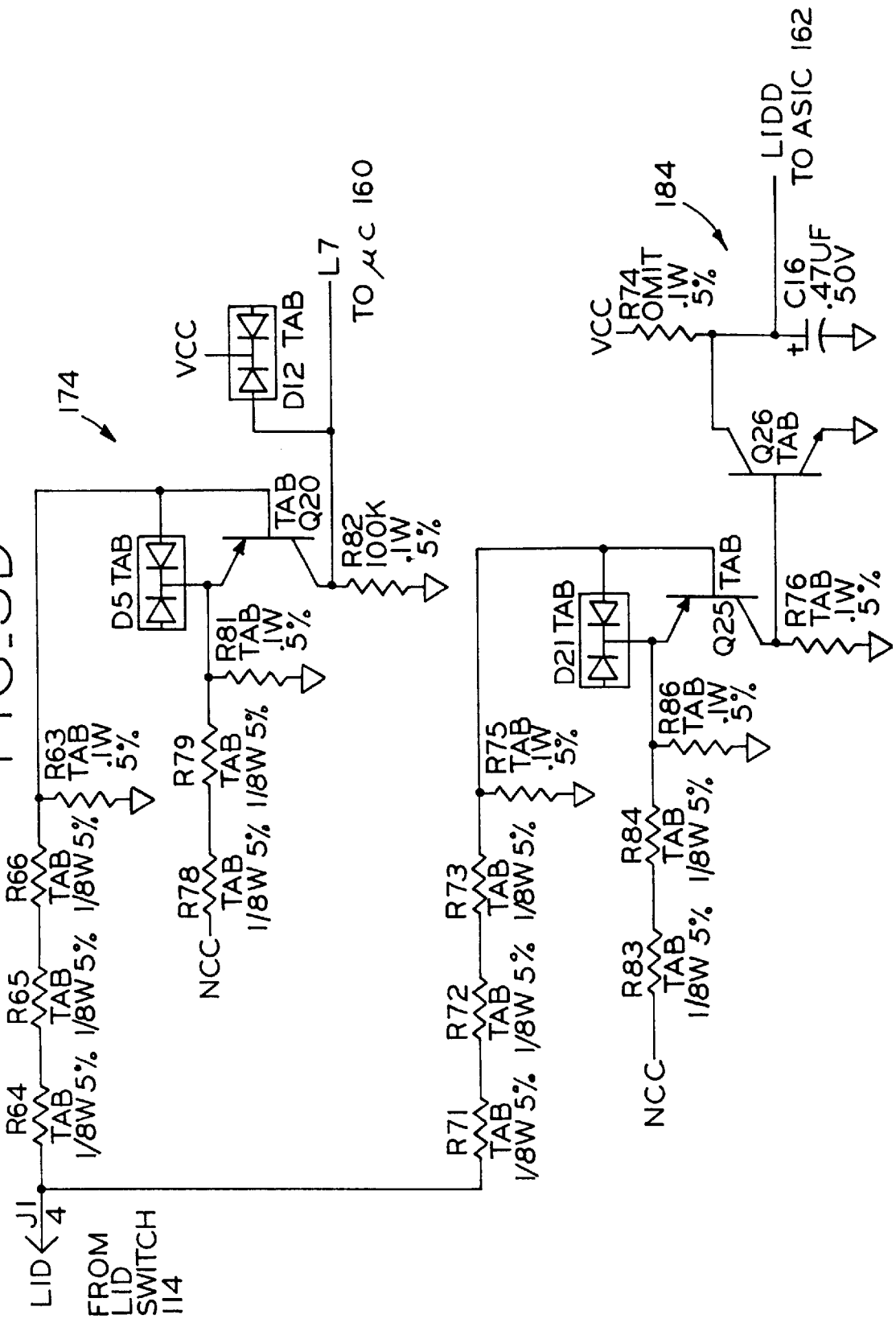

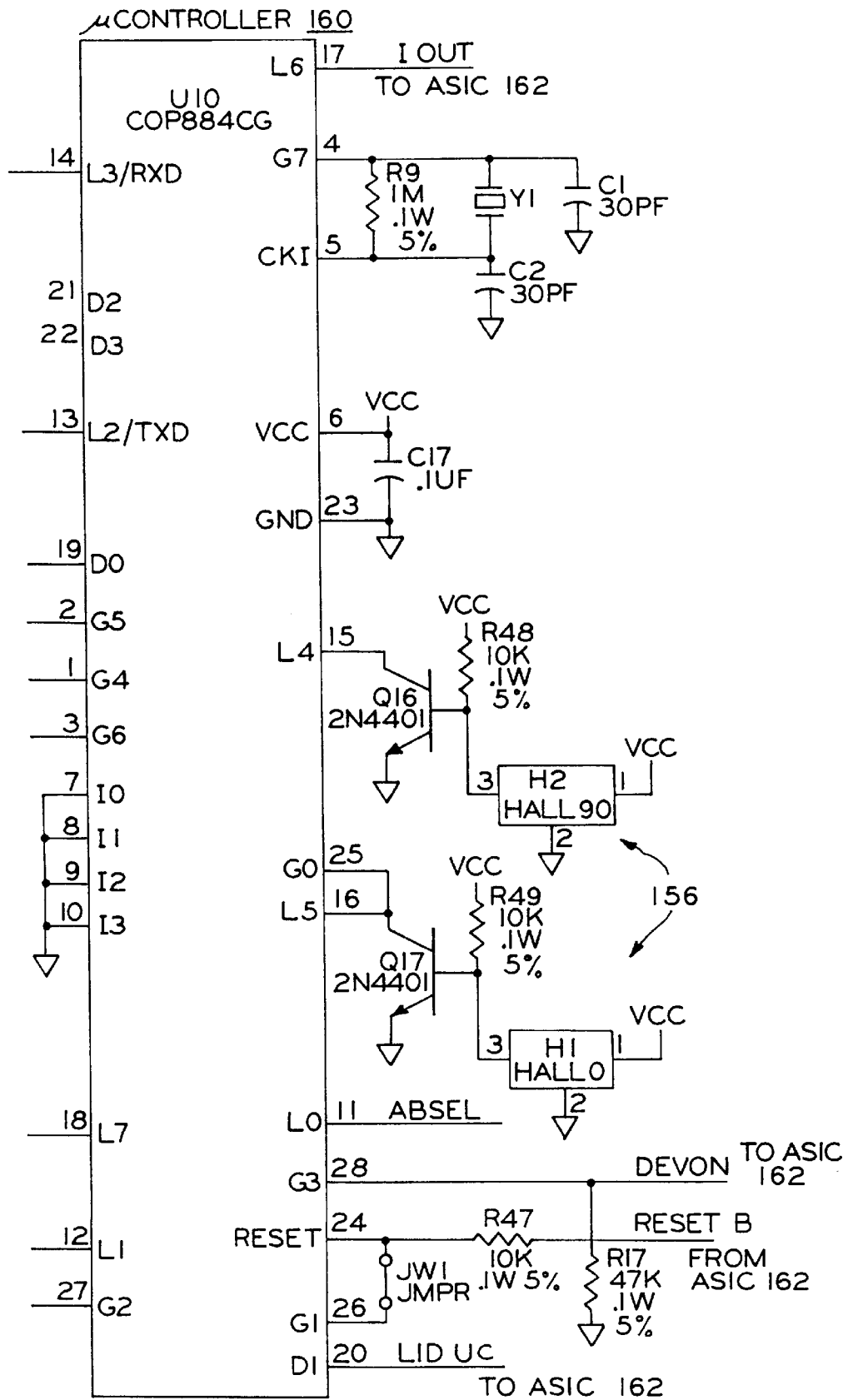
FIG_3E

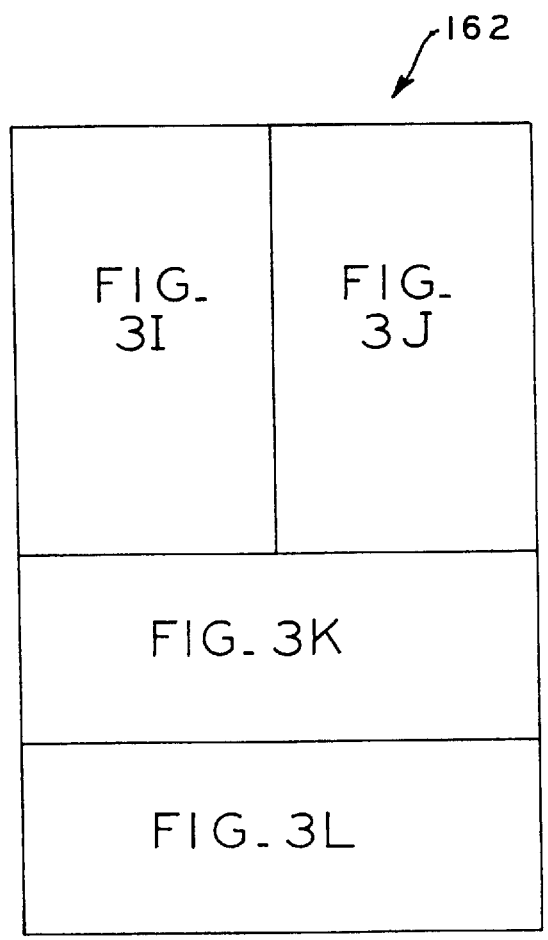

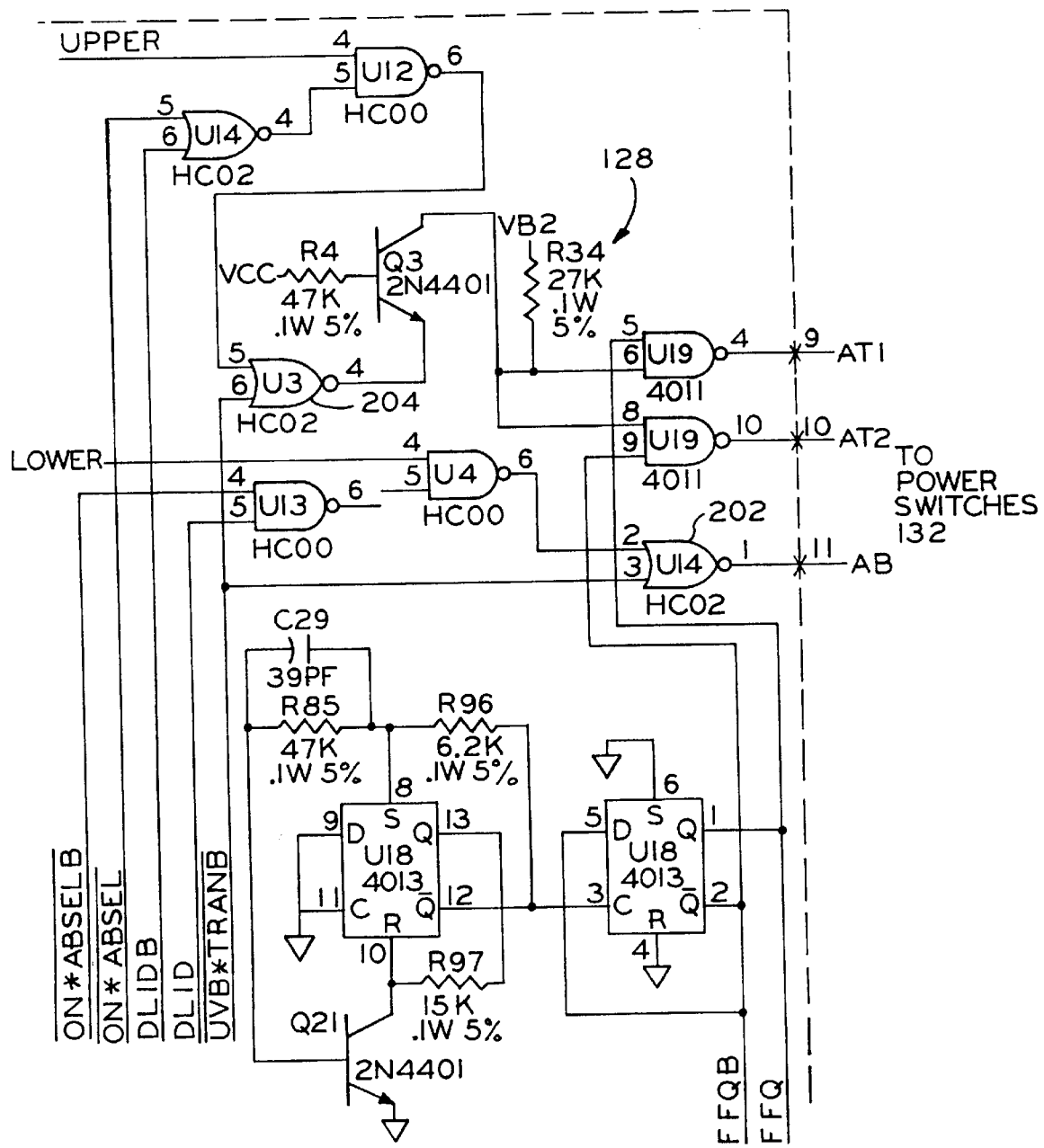
FIG_3J

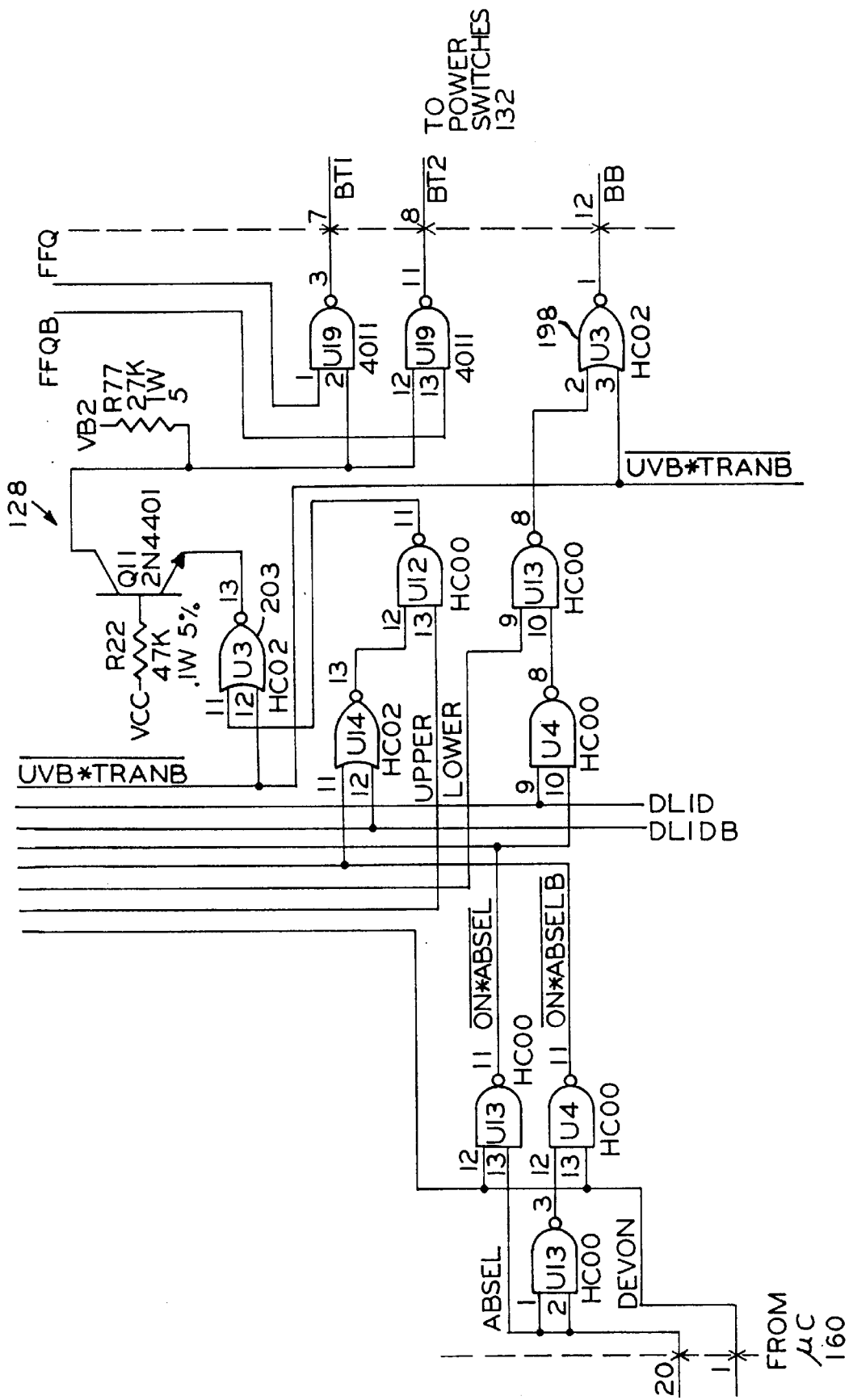

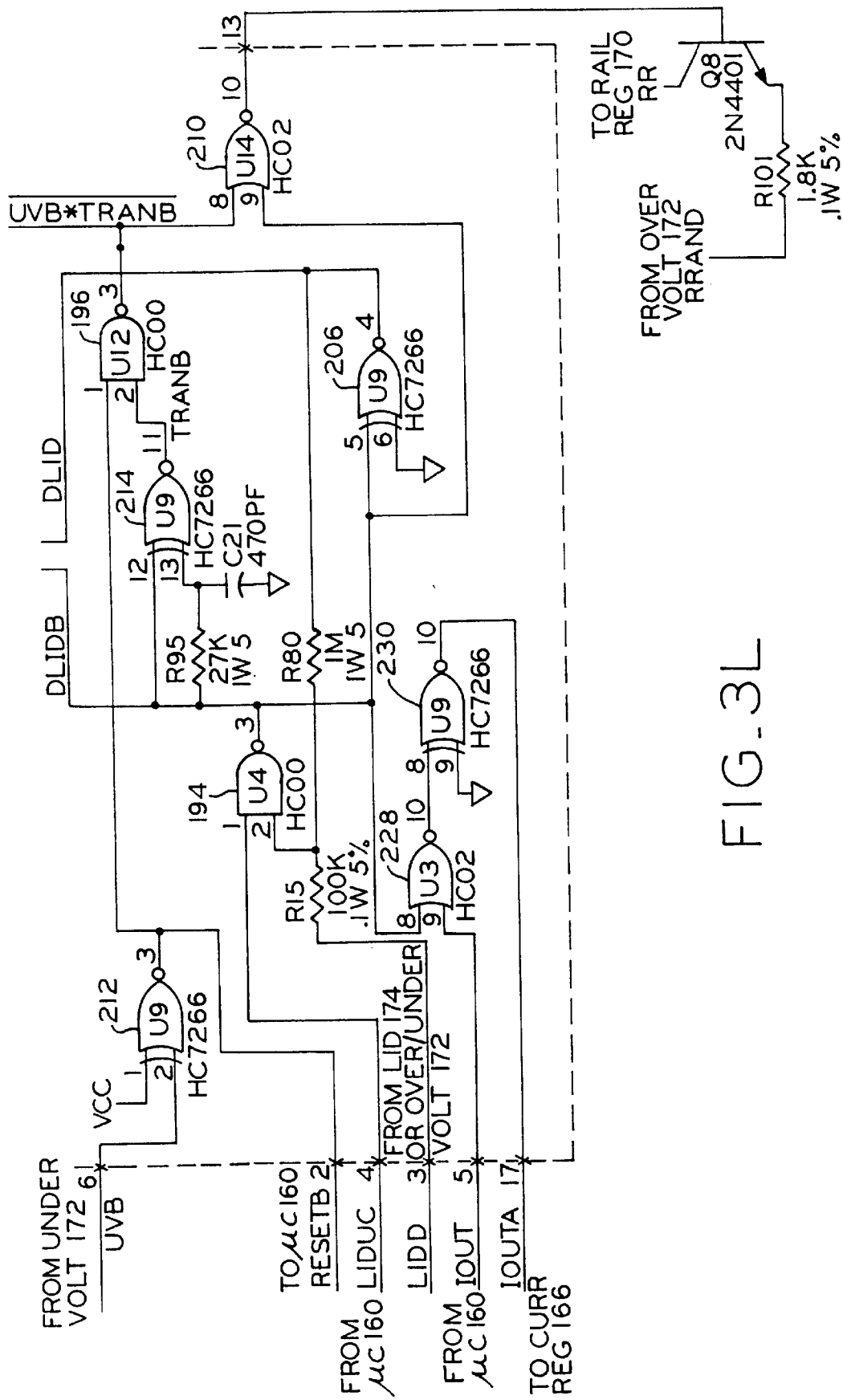
FIG._3L

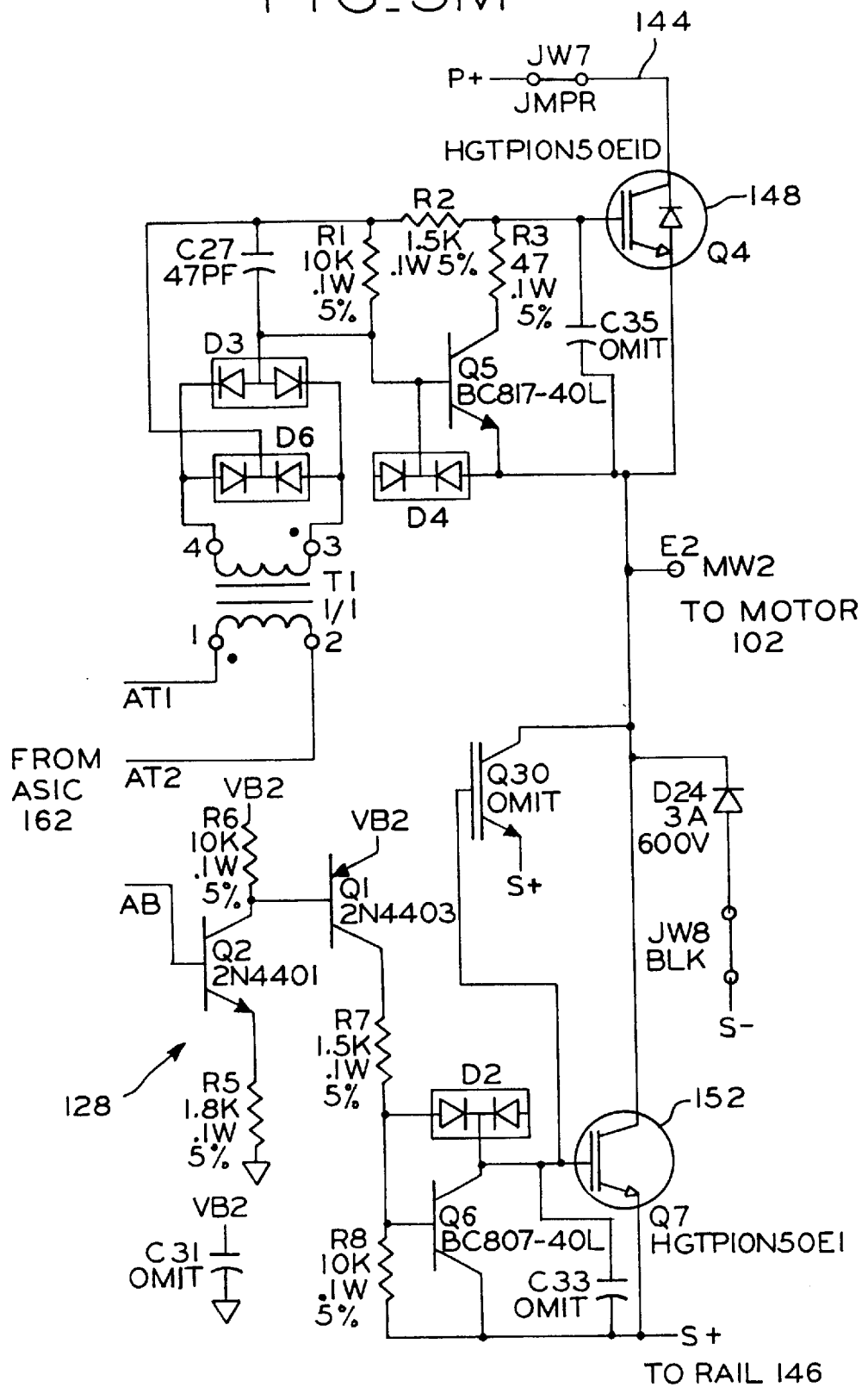

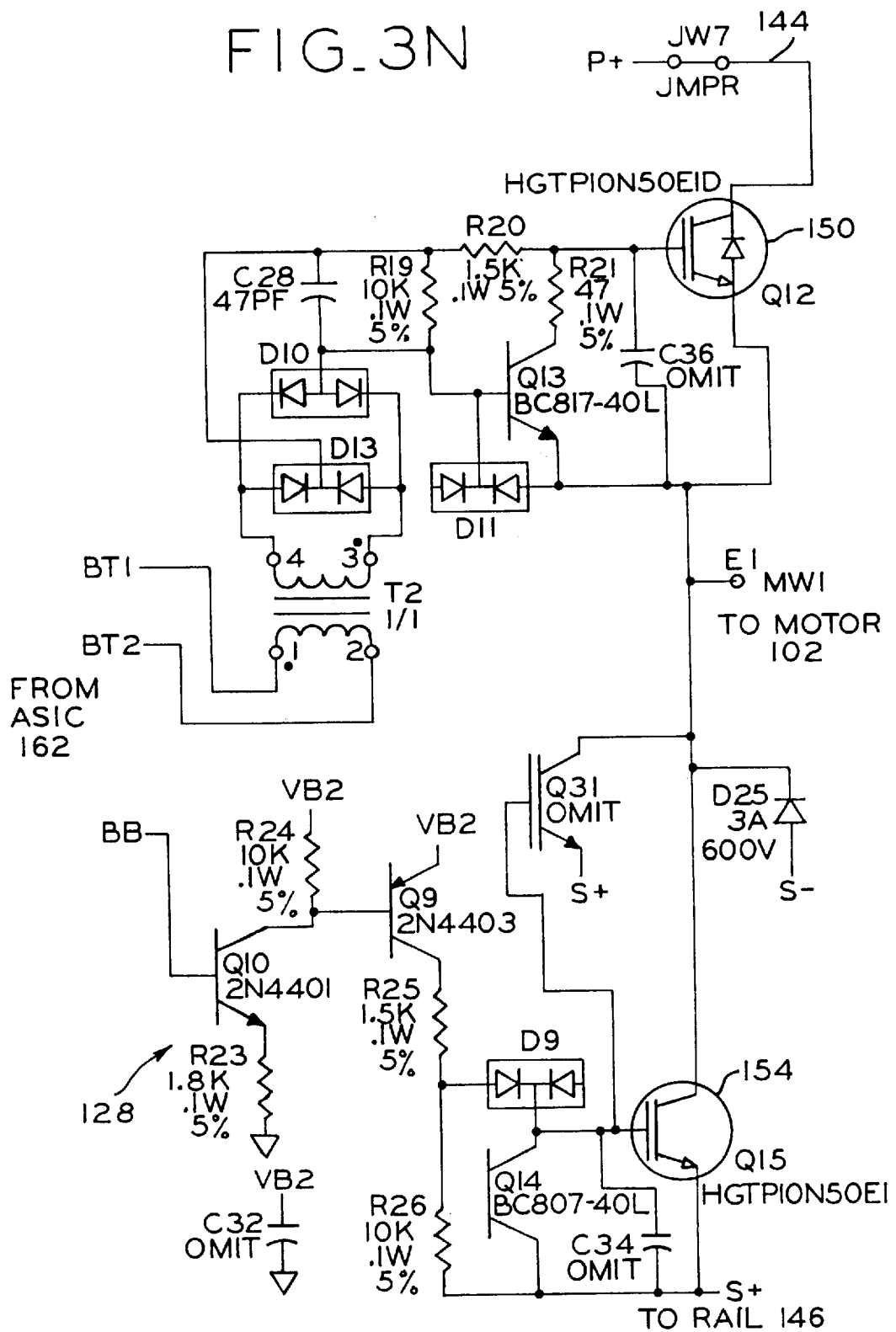

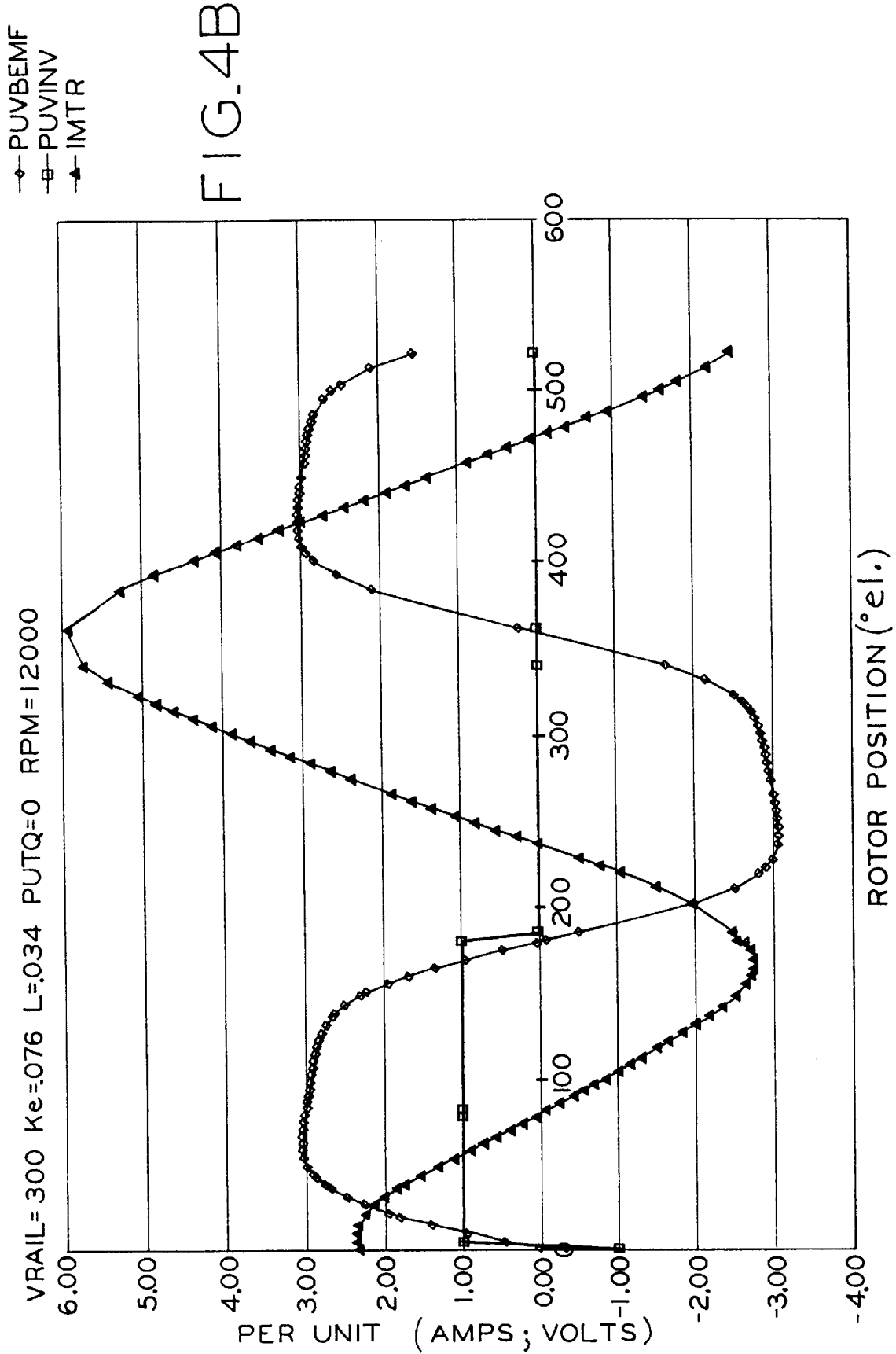

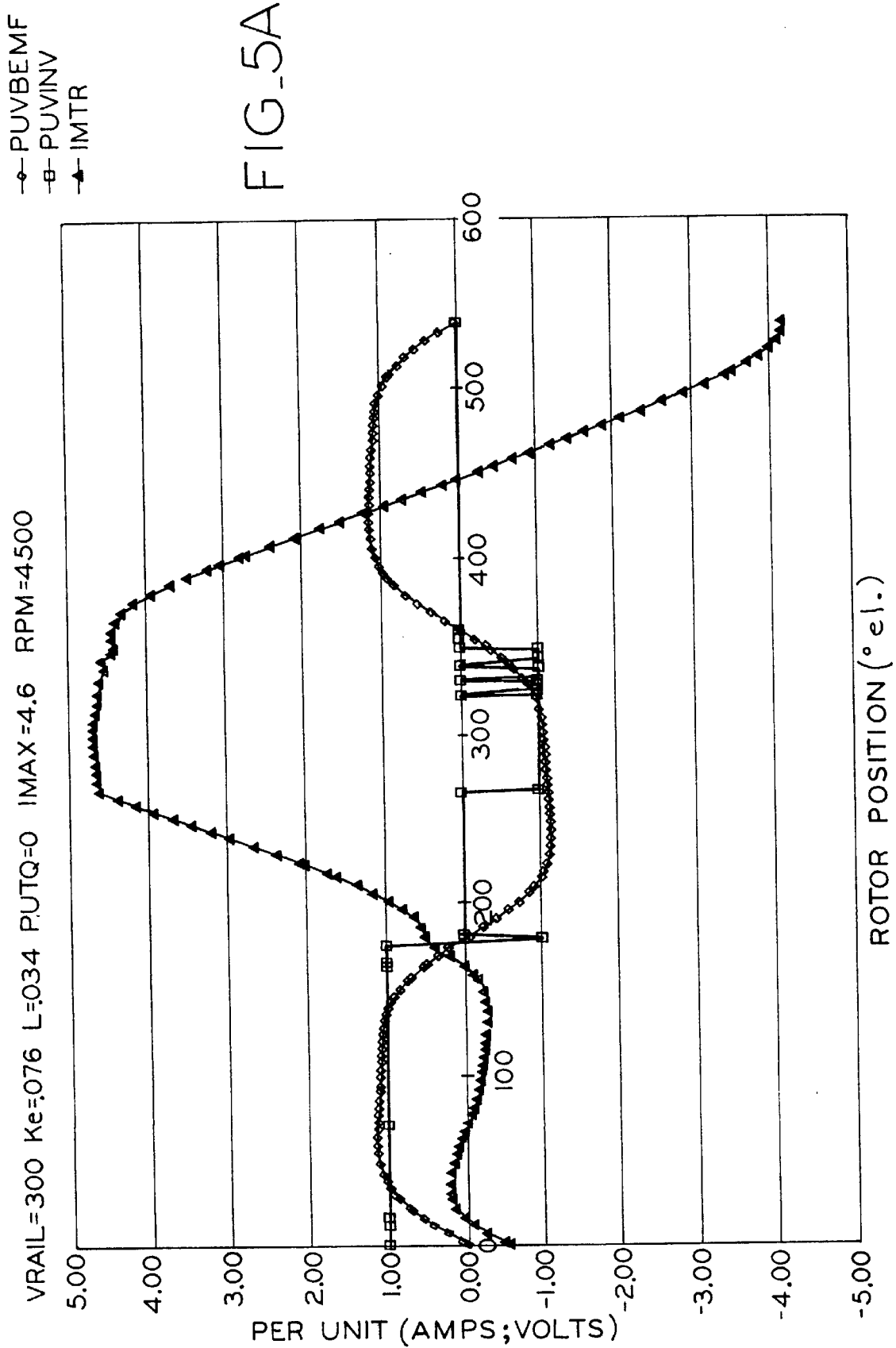
FIG._5A

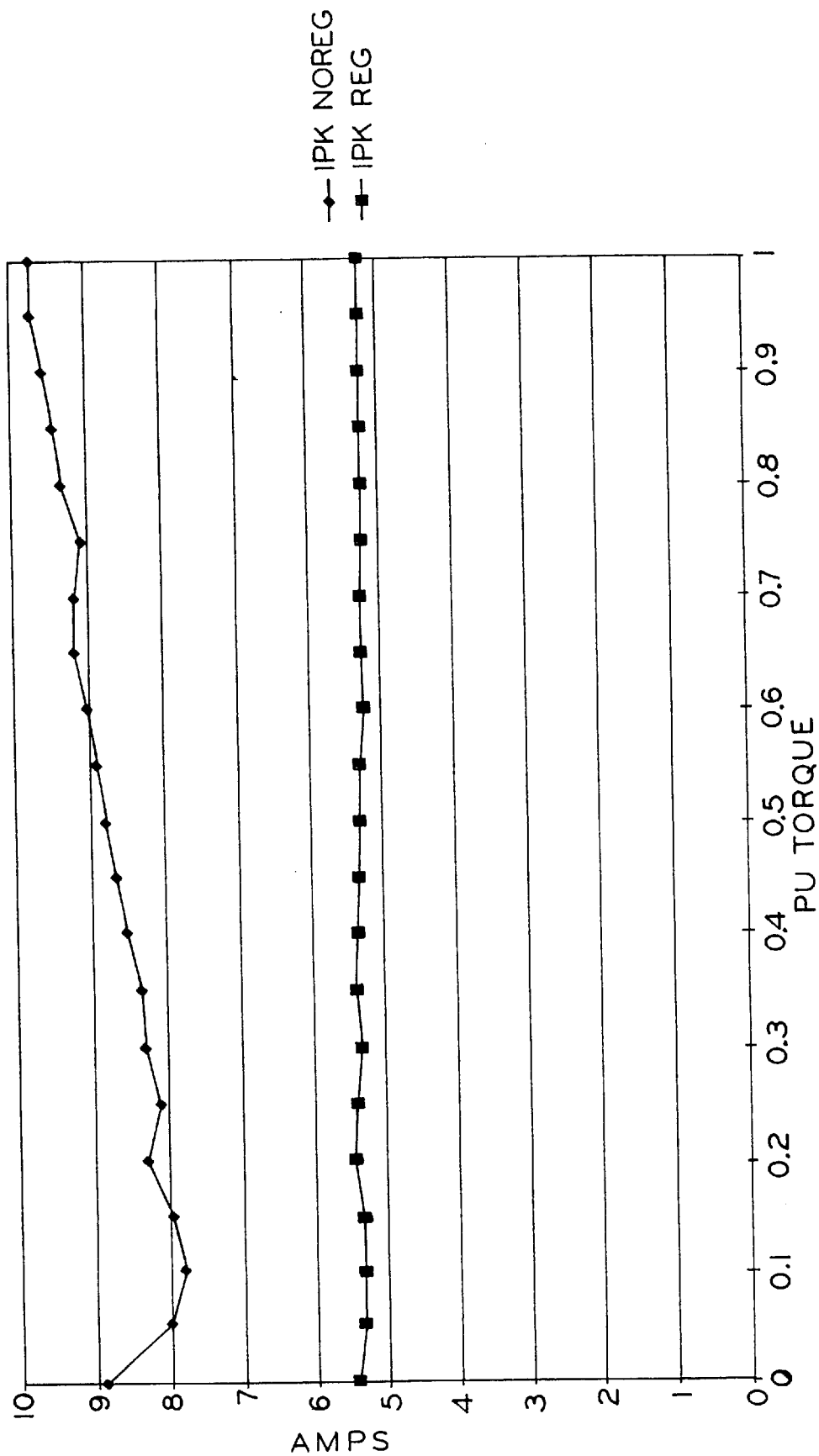

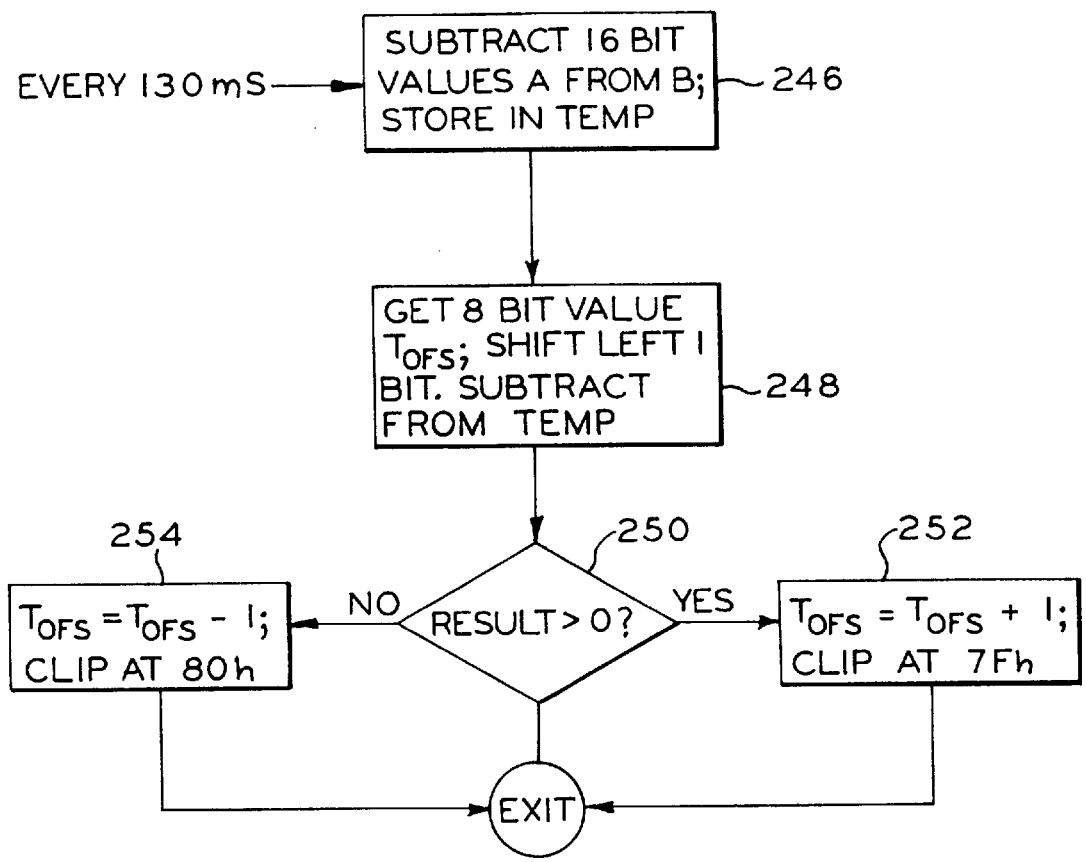
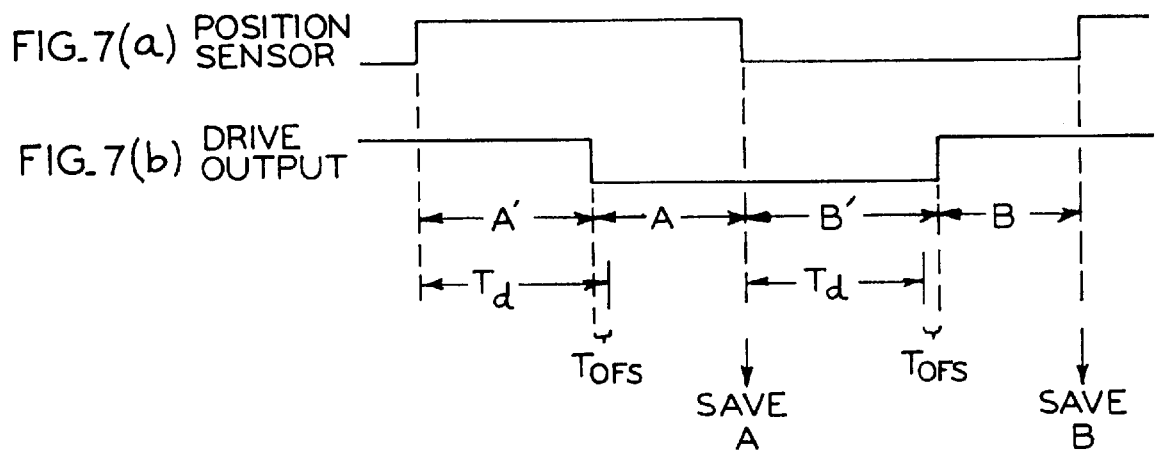

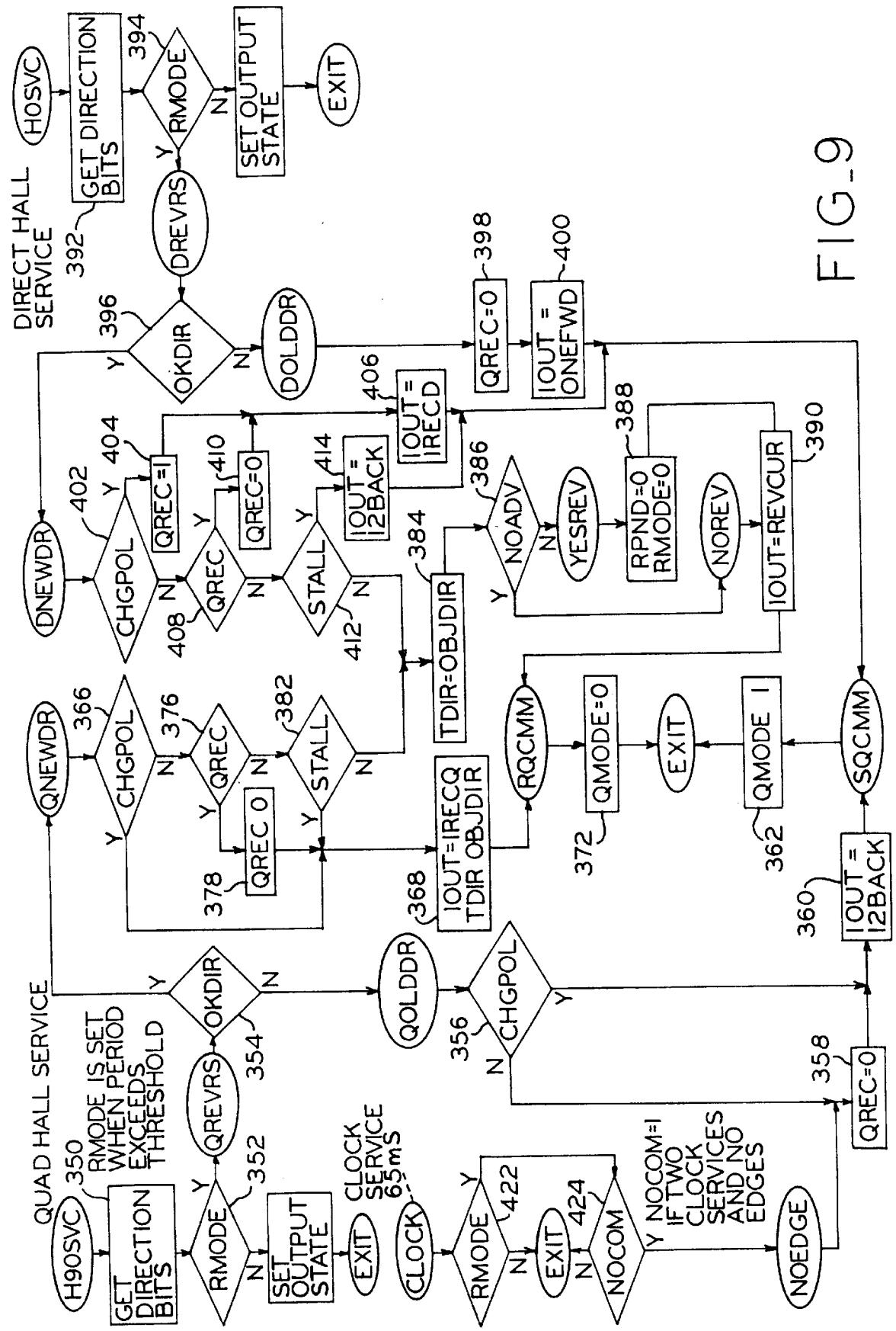
FIG_9

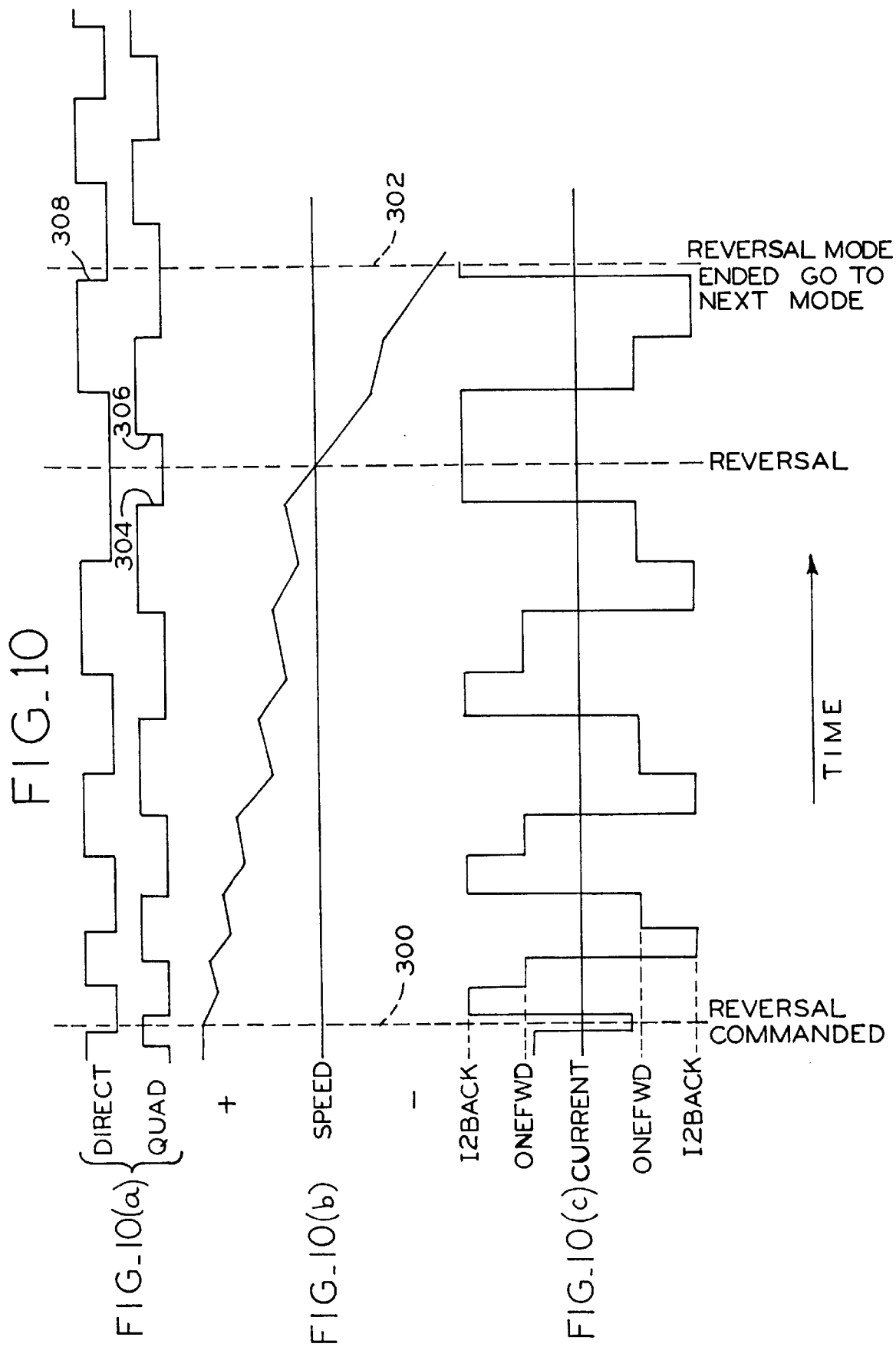

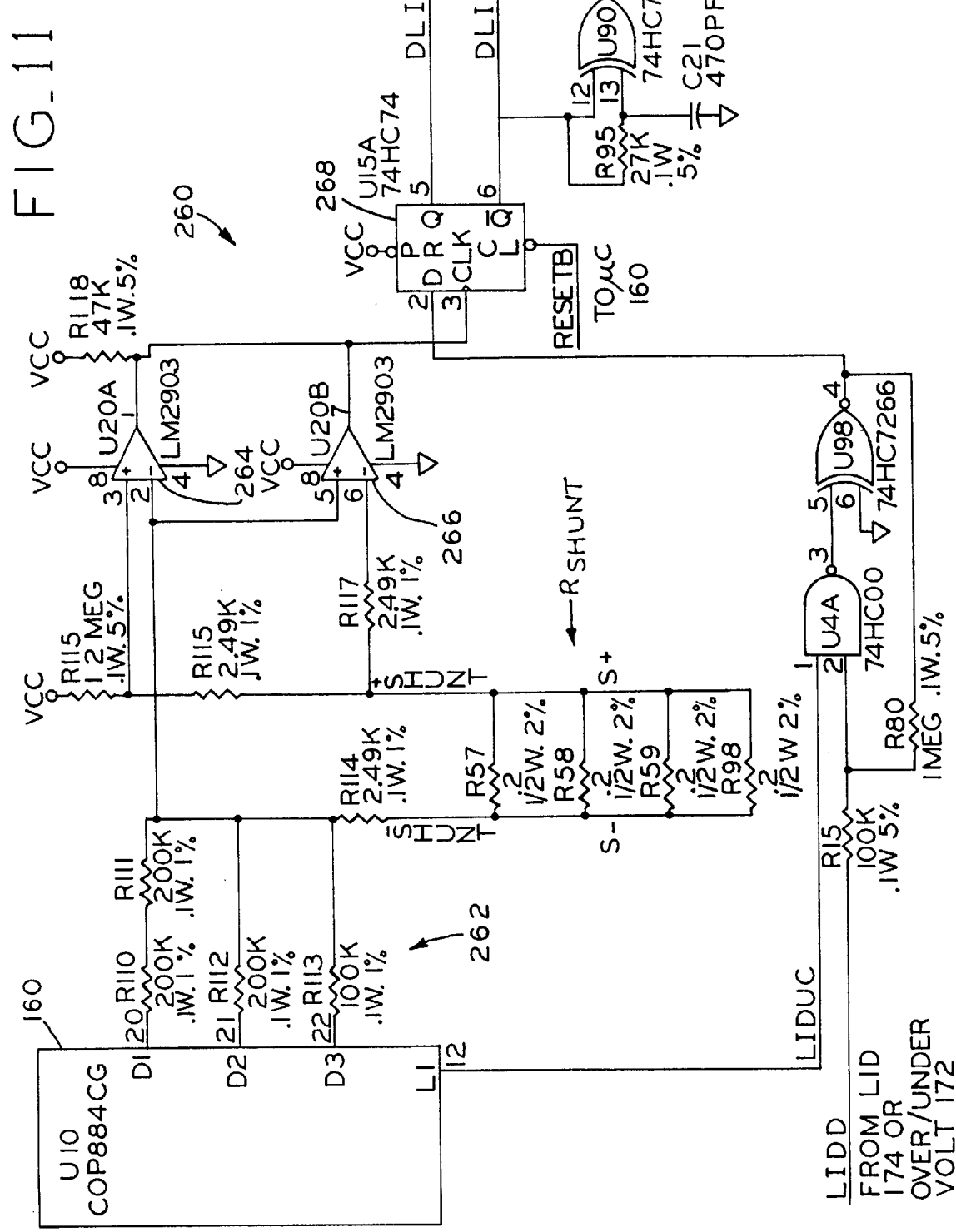
FIG_11

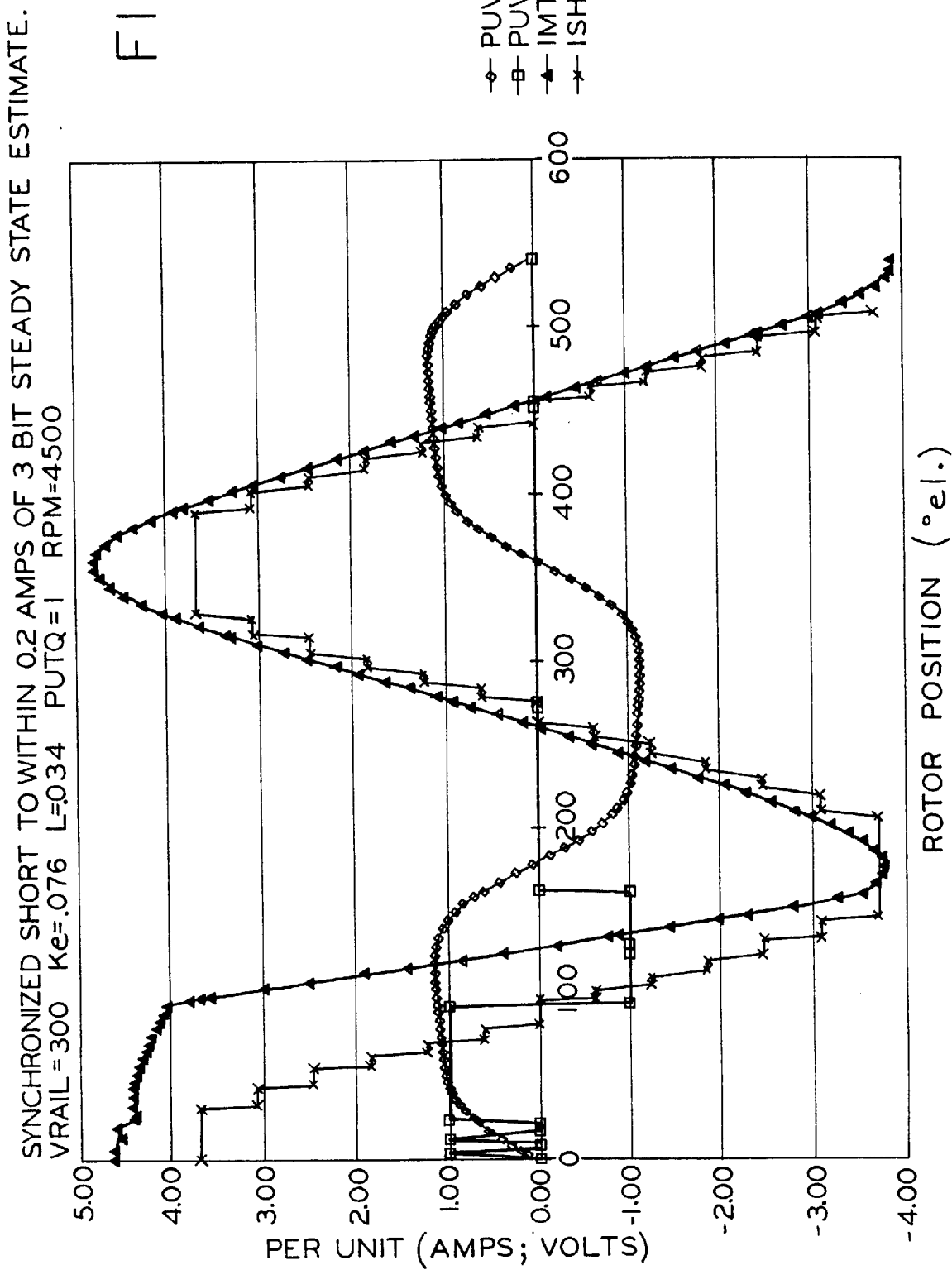

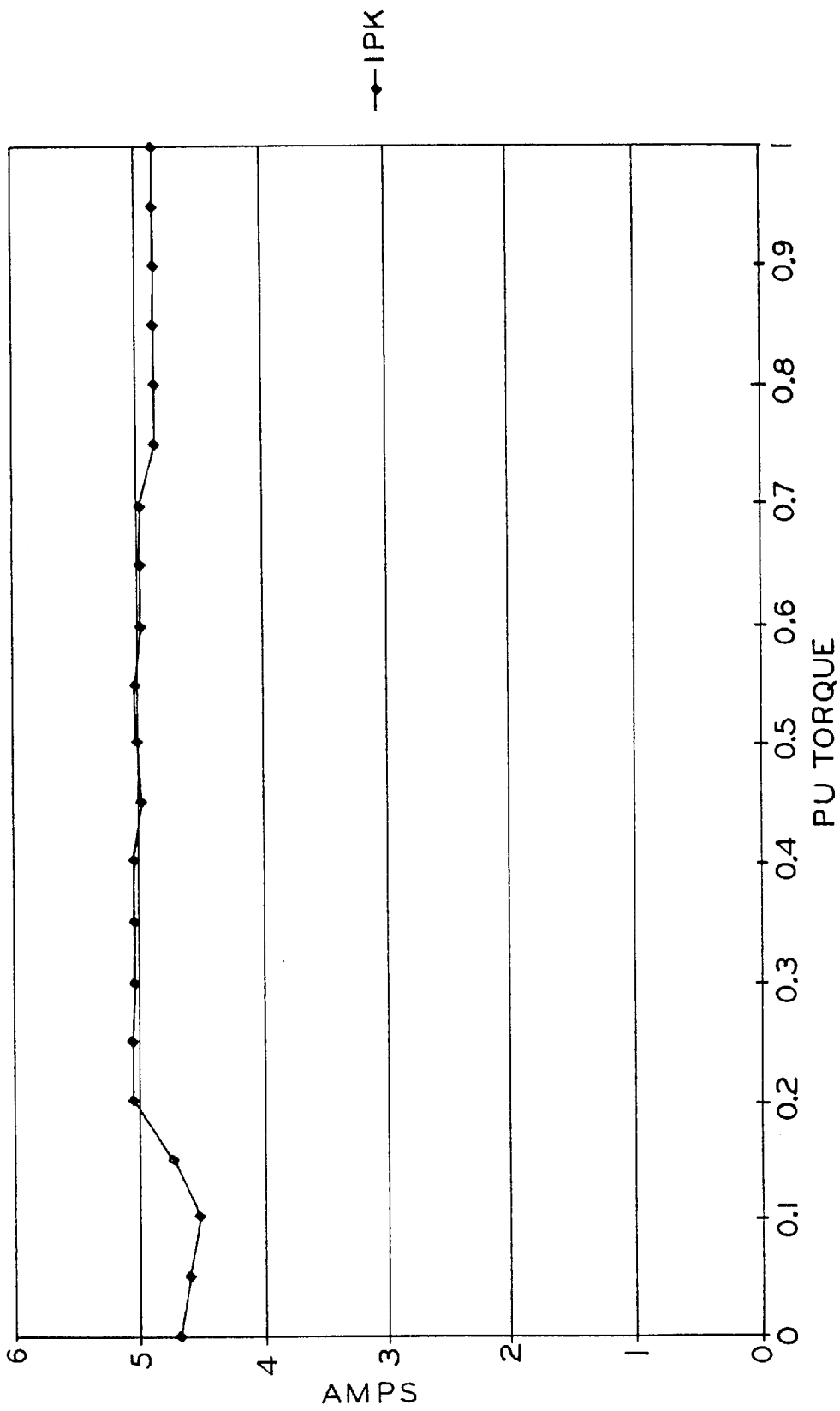

SINGLE PHASE MOTOR FOR LAUNDERING APPARATUS

BACKGROUND OF THE INVENTION

This invention relates generally to motors and controls therefor and, particularly, to an improved single phase electronically commutated motor and control for use in a washing machine.

In general, a motor such as an electronically commutated or brushless motor has permanent magnets mounted on its rotor. The stator of such a motor has a plurality of teeth and wire-wound coils on the teeth which, when energized with current, interact with the permanent magnet rotor to produce positive or negative torque, depending on the direction of the current with respect to the polarity of the magnets. The polarity of the magnets relative to the stator winding alternates when the rotor moves unidirectionally. Thus, it is necessary to alternate the direction of the stator current in synchronism to maintain a constant direction of torque. An electronic inverter bridge typically controls energization of the stator winding for controlling the direction and amount of torque produced by the motor as well as the rotor shaft speed.

Conventional motors have been unable to provide the desired speed-torque profile for use in a washing machine along with the cost advantages of a single phase motor. In particular, washing machine applications require high torque at low speeds during washing and low torque at high speeds for spin drying.

In general, brushless dc motors are disclosed in, for example, U.S. Pat. Nos. 5,423,192, 4,933,584 and 4,757,241, all of which are commonly assigned with the present invention described herein and the entire disclosures of which are incorporated herein by reference. In particular, single phase motors are disclosed in, for example, U.S. Pat. Nos. 5,483,139, 5,465,019, 5,140,243, 4,724,678, 4,635,349, 4,626,755, 4,313,076 and 3,134,385, all of which are commonly assigned with the present invention described herein and the entire disclosures gf which are incorporated herein by reference.

SUMMARY OF THE INVENTION

Among the several objects of this invention may be noted the provision of an improved motor system which is particularly well suited for use with an automatic washing machine; the provision of such a system which permits shutting down the motor by shorting its winding; the provision of such a system which initiates a motor shutdown in response to an open washing machine lid; the provision of such a system which initiates a motor shutdown in response to an overvoltage condition; the provision of such a system which initiates a motor shutdown in response to an undervoltage condition; the provision of such a system which provides current and voltage regulation; the provision of such a system which determines a steady state estimate of the motor current; the provision of such a system which synchronizes the motor shutdown response to the steady state current estimate; provision of such a system which provides improved motor reversals; the provision of such a system which provides improved position sensing; the provision of such a system which provides improved commutation as a function of the motor speed and desired current; and the provision of such a motor system which is economically feasible and commercially practical.

Briefly described, a motor and control embodying aspects of the invention includes a stationary assembly having a winding and a rotatable assembly in magnetic coupling relation to the stationary assembly. A power supply link provides power to the winding. According to the invention, the power supply link has upper and lower rails supplied by a power supply and power switches responsive to a motor control signal for selectively connecting the rails to the winding to energize the winding with a motor current. As such, an electromagnetic field is produced for rotating the rotatable assembly. The power switches include upper and lower switches, each having a conducting state and a nonconducting state. The motor and control also includes a disable circuit for selectively generating a disable signal and a control circuit for generating the motor control signal to control the power switches. The control circuit is responsive to the disable signal for controlling the power switches so that the lower power switches become conducting and the upper power switches become nonconducting, or vice-versa, thereby de-energizing the winding to disable the motor.

In another embodiment, the present invention is directed to a controller for a motor. The motor includes a stationary assembly having a winding and a rotatable assembly in magnetic coupling relation to the stationary assembly. A power supply link having upper and lower rails supplied by a power supply and power switches each having a conducting state and a nonconducting state provides power to the winding. The power switches include upper and lower switches. The controller includes a circuit for generating a motor control signal for controlling the power switches. The power switches are responsive to the motor control signal for selectively connecting the rails to the winding to energize the winding. As such, an electromagnetic field is produced for rotating the rotatable assembly. The controller also includes a disable circuit for selectively generating a disable signal. The circuit for generating the motor control signal is responsive to the disable signal for controlling the power switches so that the lower power switches become conducting and the upper power switches become nonconducting, or vice-versa, thereby de-energizing the winding to disable the motor.

In yet another embodiment, a motor and control embodying aspects of the invention includes a stationary assembly having a winding and a rotatable assembly in magnetic coupling relation to the stationary assembly. A power supply link provides power to the winding. According to the invention, the power supply link has upper and lower rails supplied by a power supply and power switches responsive to a motor control signal for selectively connecting the rails to the winding to energize the winding with a motor current. As such, an electromagnetic field is produced for rotating the rotatable assembly. The motor and control also includes a direct position sensor and a quadrature position sensor for sensing an angular position of the rotatable assembly relative to the stationary assembly. The direct and quadrature position sensors provide direct and quadrature position signals, respectively, approximately 90° (electrical) out of phase with each other, which are representative of the sensed position of the rotatable assembly. The motor and control further includes a control circuit for generating the motor control signal as a function of the sensed position of the rotatable assembly to control the power switches. The control circuit is responsive to a reverse direction command for changing operation of the motor from a forward mode to a reversing mode. The forward mode is defined by commutation of the winding generally in phase with the direct position signal and the reversing mode is defined by commutation of the winding generally in phase with the quadrature position signal.

In another embodiment, a motor and control embodying aspects of the invention includes a stationary assembly having a winding and a rotatable assembly in magnetic coupling relation to the stationary assembly. A power supply link provides power to the winding. According to the invention, the power supply link has upper and lower rails supplied by a power supply and power switches responsive to a motor control signal for selectively connecting the rails to the winding to energize the winding with a motor current. As such, an electromagnetic field is produced for rotating the rotatable assembly. The motor and control also includes a position sensing circuit for sensing an angular position of the rotatable assembly relative to the stationary assembly and providing a position signal representative of the sensed position. The motor and control further includes a control circuit for generating the motor control signal as a function of the sensed position of the rotatable assembly to control the power switches. The control circuit includes a processor responsive to the position signal for estimating zero crossings of back electromotive force (EMF) of the winding and generates the motor control signal for controlling the power switches to cause commutation instances to occur in advance of the estimated zero crossings by an advance interval ADV defined in microseconds by:

$$ADV=COMPER*IOUT/K_{ADV}$$

where COMPER is an elapsed time between two previous commutation instances in microseconds, IOUT is a regulated current level representative of a desired speed and/or torque of the motor, and $K_{ADV}$ is a motor dependent constant.

In yet another embodiment, a motor and control embodying aspects of the invention includes a stationary assembly having a winding and a rotatable assembly in magnetic coupling relation to the stationary assembly. A power supply link provides power to the winding. According to the invention, the power supply link has upper and lower rails supplied by a power supply and power switches responsive to a motor control signal for selectively connecting the rails to the winding to energize the winding with a motor current. As such, an electromagnetic field is produced for rotating the rotatable assembly. The motor and control also includes a position sensing circuit for sensing an angular position of the rotatable assembly relative to the stationary assembly and providing a position signal representative of the sensed position. The motor and control further includes a control circuit for generating the motor control signal as a function of the sensed position of the rotatable assembly to control the power switches. The control circuit includes a processor responsive to the position signal for detecting zero crossings of back EMF of the winding as a function of the sensed position of the rotatable assembly and for estimating subsequent zero crossings of the back EMF as a function of the detected zero crossings. The control circuit generates the motor control signal for controlling the power switches to cause commutation instances to alternately occur after the detected zero crossings by an interval A' and an interval B' as a function of a delay interval $T_d$ defined in microseconds by:

$$T_d=COMPER-ADV$$

where COMPER is an elapsed time between two previous commutation instances in microseconds and ADV is an advance interval which is a function of a desired speed and/or torque of the motor.

Other objects and features will be in part apparent and in part pointed out hereinafter.

BRIEF DESCRIPTION OF THE DRAWINGS

Figs. 4A–4B are exemplary graphs illustrating motor current relative to supply voltage and back electromotive force (EMF) for a conventional motor.

FIGS. 5A–5B are exemplary graphs illustrating motor current relative to supply voltage and back EMF for the motor of FIG. 1.

FIG. 6 is an exemplary graph of peak transient current for various motor speeds relative to per unit torque for the motor of FIG. 1 as compared to a conventional motor.

FIG. 7 is an exemplary timing diagram illustrating the relationship between rotor position and commutation of the motor of FIG. 1.

FIG. 8 is an exemplary flow diagram illustrating a routine for correcting a dc offset resulting from position sensing inaccuracies and the like.

FIG. 9 is an exemplary flow diagram illustrating a routine for reversing the motor of FIG. 1.

FIG. 10 is an exemplary timing diagram illustrating the relationship between the speed and rotor position of the motor of FIG. 1 and its motor current for reversing the motor's direction.

FIG. 11 is a schematic diagram of a circuit for synchronizing shutdown of the motor of FIG. 1 with a steady state estimate of its current.

FIG. 12 is an exemplary graph illustrating motor current relative to supply voltage and back EMF for the motor of FIG. 1 having a synchronized shutdown by the circuit of FIG. 11.

Fig. 13 is an exemplary graph of peak transient current for various motor speeds relative to per unit torque for the motor of FIG. 1 having a synchronized shutdown by the circuit of FIG. 11.

Corresponding reference characters indicate corresponding parts through the drawings.

DETAILED DESCRIPTION OF PREFERRED EMBODIMENTS

Figure 1:
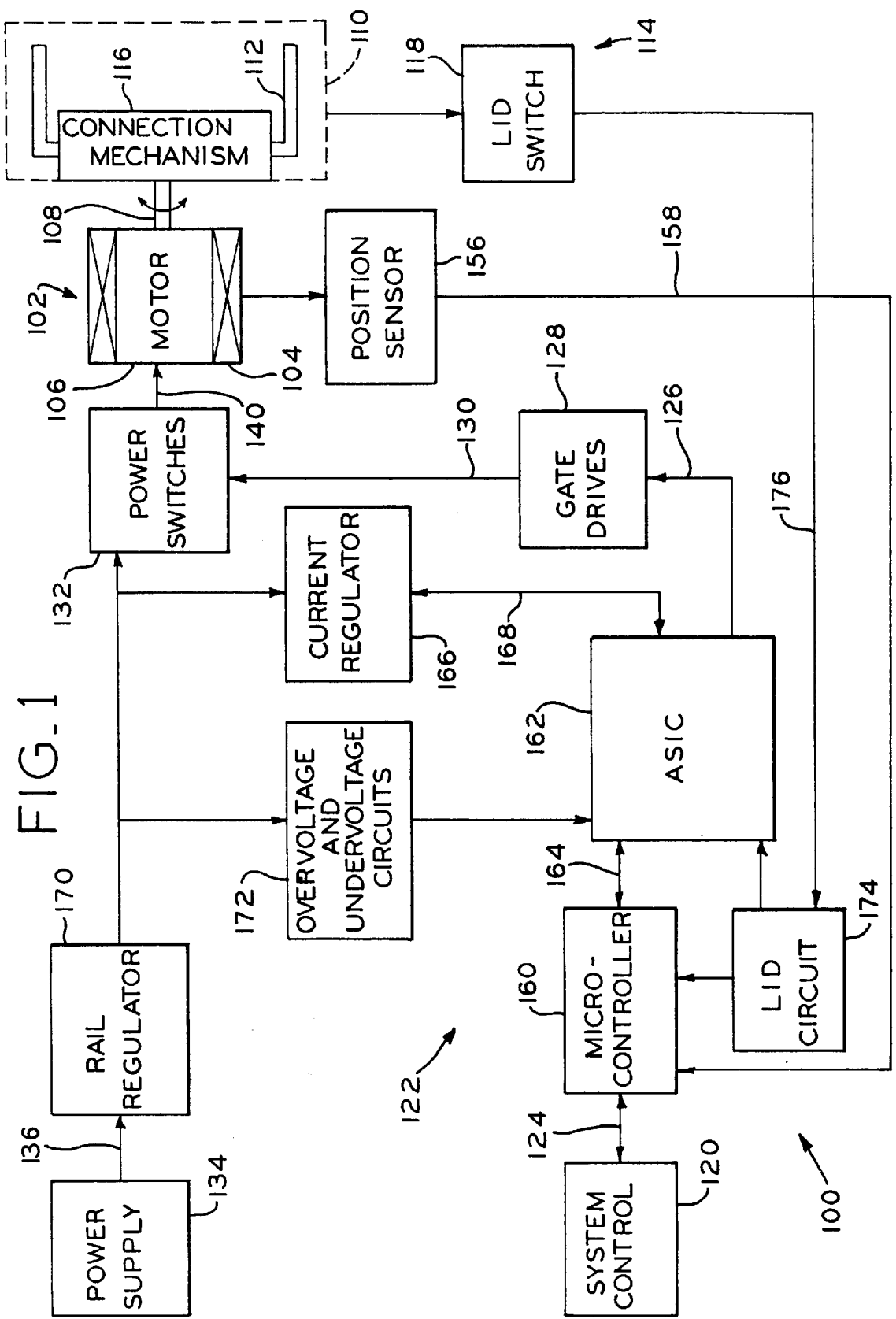
FIG. 1 is a block diagram of a motor system according to a preferred embodiment of the invention.

Referring now to the drawings, FIG. 1 shows a motor system 100 according to a preferred embodiment of the present invention. The system 100 includes a motor, generally designated 102, having a stationary assembly, or stator, 104 and a rotatable assembly, or rotor, 106 in magnetic coupling relation to the stator 104. In the embodiment described herein, the motor 102 is a single phase, electronically commutated permanent magnet motor. It is to be understood, however, that aspects of the present invention may be applied to any electronically controllable motor or dynamoelectric machine typically powered by an electronic control circuit. Such motors include, for example, external rotor motors (i.e., inside out motors), permanent magnet motors, single and variable speed motors, selectable speed motors having a plurality of speeds, brushless dc motors, electronically commutated motors, switched reluctance motors and induction motors. In addition, the motors may be multi-phase or single phase motors and, in any case, such motors may have a single split phase winding or a multi-phase winding Such motors may also provide one or more finite, discrete rotor speeds selected by an electrical switch or other control circuit. Commonly assigned application Serial No. (TO BE ASSIGNED) entitled "Single Phase Motor with Positive Torque Parking Positions," filed Dec. 5, 1996, the entire disclosure of which is incorporated herein by reference, describes a suitable motor having a notched stator for use according to the present invention.

In a preferred embodiment of the invention, a motor shaft 108 mechanically connects the rotor 106 to a particular device to be driven, such as a rotatable component 110. For example, the rotatable component 110 comprises a basket 112 which is part of a horizontal axis or center-post-agitate automatic washing or laundry machine, generally indicated 114. Preferably, rotatable component 110 also includes a connection mechanism 116 for coupling the basket 112 to the shaft 108. The connection mechanism 116 may comprise a fixed ratio speed reducer, such as a gear box or a pulley arrangement or, in some applications, shaft 108 of motor 102 may be directly coupled to basket 112. Although disclosed for use with basket 112, it is to be understood that motor 102 may be part of a number of different systems for driving a rotatable component. For example, rotatable component 110 may be an agitator and/or basket of a vertical axis washing machine or a fan, blower, compressor or the like. Commonly assigned U.S. Pat. Nos. RE 33,655, 5,492,273, 5,418,438, 5,423,192, and 5,376,866, the entire disclosures of which are incorporated herein by reference, describe various rotatable components for which the present invention is suited for use.

In laundering apparatus such as the laundry machine 114, basket 112 is rotatable within a tub (not shown) which holds water for washing the fabrics to be laundered. Basket 112 first agitates water and fabrics to be laundered and then spins them to cause a centrifugal displacement of water from the tub. The tub has a lid (not shown) movable by a user between an open position and a closed position. In one embodiment, laundry machine 114 includes a lid switch 118 that provides a signal representative of the position of the lid for use in ensuring that machine 114 does not operate when its lid is open.

Preferably, a user interface, or system control, 120 provides system control signals in the form of motor commands to a control circuit, generally indicated 122, via line 124. In this instance, the system control 120 provides signals representing desired washing times, desired washing cycles, and the like. As represented by the block diagram of FIG. 1, the control circuit 122 provides motor control, or commutation, signals via line 126 for electronically controlling a plurality of gate drives 128. In turn, the gate drives 128 provide drive signals via line 130 for switching a plurality of power switches 132, such as IGBT's, BJT's or MOSFET's. In addition to level shifting the drive signals from, for example, 5 volts to 15 volts for driving the power switches 132, gate drives 128 also condition the signals provided by control circuit 122 via line 126 for optimal operation of power switches 132.

As shown in FIG. 1, a power supply 134 provides high voltage dc power via line 136 to power switches 132. By selectively switching the power supply 134 in connection with a motor winding 138 (see FIG. 2) included in stator 104, power switches 132 provide power via line 140 to motor 102. As such, lines 136 and 140 in combination with power switches 132 constitute a power supply link for connecting power supply 134 to the motor winding 138. Preferably, power switches 132 energize motor winding 138 in a preselected sequence for commutating motor 102 in response to control circuit 122. In this instance, control circuit 122 selectively activates power switches 132 to control rotation in motor 102 as a function of a commutation signal. It is to be understood that power supply 134 may also provide power to operate control circuit 122.

Figure 2:
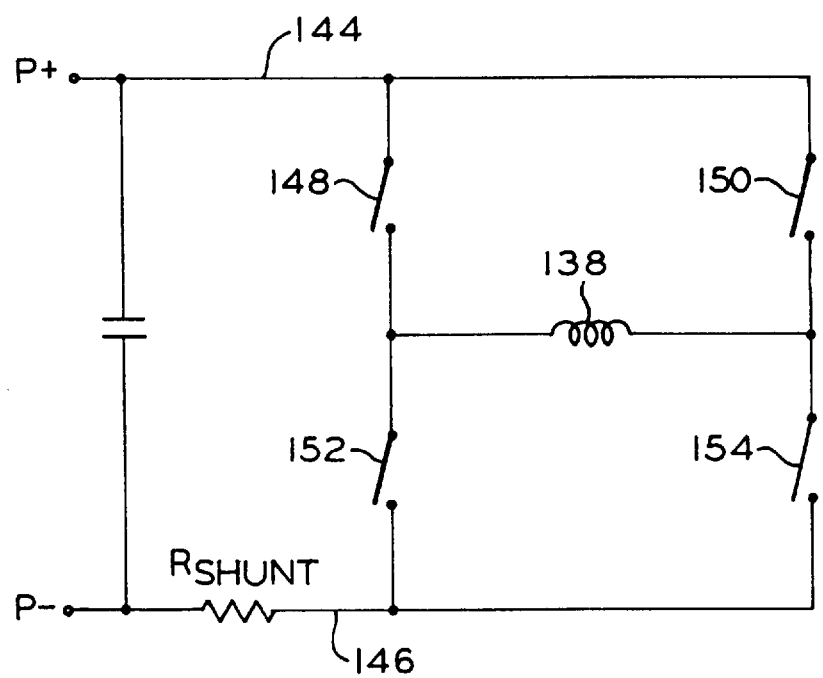
Fig. 2 is a schematic diagram of an inverter bridge for driving the motor of FIG. 1.

Referring now to FIG. 2, power switches 132 are preferably part of an inverter bridge 142. In a preferred embodiment of the invention, inverter bridge 142 comprises an H-bridge having a positive, or upper, rail 144 and a negative, or lower, rail 146 supplied by power supply 134. Power switches 132 include two upper switches 148, 150 and two lower switches 152, 154. Although not illustrated in FIG. 2, flyback diodes may be coupled in an anti-parallel relationship with each switch. A shunt resistor, current transformer, Hall-effect current sensor, integrated current sensor or other sensor or circuit known in the art may be used to sense the winding or motoring current of motor 102. In the illustrated embodiment, system 100 includes a resistive shunt $R_{SHUNT}$ in the lower rail 146 of inverter bridge 142.

A preferred excitation scheme for motor 102 involves commanding two switches on during each commutation interval, one from upper switches 148, 150 and one from lower switches 152, 154. In particular, control circuit 122 generates a suitable commutation signal to turn on one of upper switches 148, 150 and a diagonally-positioned one of lower switches 152, 154. By activating power switches 132 in pairs, inverter bridge 142 connects motor winding 138 to upper and lower rails 144, 146 and, thus, connects it to power supply 134. In normal operation, control circuit 122 also selects one of either upper switches 148, 150 or lower switches 152, 154 to be used for pulse width modulating the power applied to winding 138 at a given time for controlling the motor current. For example, the active upper switch 148 or 150 is used for pulse width modulation (PWM) during normal motoring operation. Commonly assigned U.S. Pat. No. 4,757,603, the entire disclosure of which is incorporated herein by reference, shows an exemplary PWM control of a motor.

Referring again to FIG. 1, control circuit 122 includes a position sensor 156 which provides feedback via line 158 representative of the angular position of rotor 106 relative to stator 104. In a preferred embodiment, the position sensor 156 comprises one or more Hall sensors (see Hall sensors H1 and H2 in FIG. 3E) providing a rotor position feedback signal which has a predefined angular relationship relative to the motor back electromotive force (EMF) (e.g., in phase or 90° out of phase with the back EMF). Other position sensors, such as optical sensors, may also be used to provide rotor position feedback instead of or in addition to the Hall sensors. Commonly assigned application Ser. No. 08/680, 010, filed Jul. 15, 1996, the entire disclosure of which is incorporated herein by reference, describes a quadrature winding suitable for generating a position signal in a single phase motor according to the present invention.

In one preferred embodiment, control circuit 122 includes a microprocessor or microcomputer, such as microcontroller 160 (shown in detail in FIG. 3E), and includes an application specific integrated circuit (ASIC) or a universal electronically commutated motor integrated circuit (UECM IC), such as ASIC 162 (shown in detail in FIGS. 3I–3L). As shown, the microcontroller 160 and the ASIC 162 communicate with each other via line 164. National Semiconductor manufactures a suitable microcontroller 160 under its model number COP884.

According to the invention, a state machine, operating as a commutator estimator circuit, is implemented by microcontroller 160 to determine the appropriate commutation instances for controlling motor 102. In turn, ASIC 162 outputs the commutation signals for controlling power switches 132 via gate drives 128. Although illustrated as external to ASIC 162, it is to be understood that gate drives 128 may be internal to ASIC 162.

Preferably, control circuit 122 generates its commutation signals as a function of the zero crossings of the back EMF of winding 138. As such, the product of the current and the back EMF determines torque production in motor 102. In order to sustain positive torque, it is necessary to energize winding 138 when the back EMF has crossed zero in the direction that will oppose the voltage energizing it. Since it is desired that motor current crosses zero at the time the motor back EMF also crosses zero, control circuit 122 preferably commutates motor 102 at an angle relative to the next back EMF zero crossing. In other words, control circuit 122 estimates subsequent back EMF zero crossings based on the sensed position of rotor 106 and generates gate drive signals at line 126 for driving power switches 132 coincident with or in advance of the estimated back EMF zero crossings. Thus, control circuit 122 generates the commutation signals as a function of the sensed position of rotor 106 as represented by the position signal. As an example, commonly assigned U.S. Pat. No. 5,423,192, the entire disclosure of which is incorporated herein by reference, describes one preferred means for detecting zero crossings.

In operation, control circuit 122 generates commutation signals via line 126 in response to the system control signals to cause system 100 to produce a motor current that matches the load torque demand as a function of a regulated current reference level. By matching torque load with produced torque, motor 102 is able to operate at a desired torque or speed. The commutation signals preferably include a series of pulse width modulated cycles, wherein each cycle causes a corresponding switching event of power switches 132. In turn, the current in winding 138 produces an electromagnetic field for rotating the rotor 106 of motor 102. To control the speed of rotatable component 110, system 100 preferably controls the speed of motor 102 by controlling the power delivered to the load. In particular, system 100 regulates current in motor 102, which in turn regulates torque, to obtain the desired motor speed by matching the load and motor loss demand torque at the desired speed. Control circuit 122 further generates commutation signals for reversing motor 102.

Referring further to FIG. 1, system 100 also includes a current regulator circuit 166 (shown in detail in FIG. 3F) which uses information regarding the current sensed in $R_{SHUNT}$ for controlling current in winding 138. The current regulator circuit 166 cooperates with microcontroller 160 and ASIC 162 for regulating current in motor system 100. In particular, current regulator circuit 166 compares the sensed current to a regulated current reference level and to a maximum current level. In the illustrated embodiment, the regulated current level is determined by microcontroller 160 and communicated to current regulator circuit 166 via ASIC 162 and line 168. In one embodiment, the regulated current reference level is a peak regulated current for normal operation communicated by a pulse width modulated signal having a variable duty cycle representative of the desired level. For example, the duty cycle may vary from 0% to 100% where 100% corresponds to a highest peak regulated current value and the duty cycle is proportional to the desired current in motor 102. In the alternative, control circuit 122 generates a variable voltage signal, the magnitude of which represents the desired current. Other suitable means for providing the peak regulated current level include a simple resistor circuit or potentiometer.

As an example of the operation of motor 102, control circuit 122 enables a pair of power switches 132 (i.e., switches 148, 154 or switches 150, 152), each on an opposite side of winding 138, for normal motoring operation. One of the two active switches (e.g., switch 148 or switch 150) performs pulse width modulation while the other (e.g., switch 154 or switch 152) remains in its on, or conducting, state for the entire commutation interval as commanded by the commutation logic. The polarity of the motor back EMF during this time interval is counter to the supply voltage so that the driving electromotive force to develop current in motor 102 is the supply minus the back EMF.

Current regulator circuit 166 further compares the sensed current in the power supply link to a maximum current level. The maximum current level is, for example, 10–50% greater than the highest peak regulated current level. Preferably, the maximum current level is fixed according to the power limitations of power switches 132, control circuit 122 and/or motor 102. According to the invention, current regulator circuit 166 compares the sensed current in the power supply link to the maximum current level and generates an overcurrent signal when the sensed current exceeds the maximum current level. As will be described in detail below, control circuit 122 employs the overcurrent signal for setting the PWM state machine of microcontroller 160 accordingly.

Commonly assigned application Ser. No. 08/647,694, filed May 15, 1996, the entire disclosure of which is incorporated herein by reference, discloses a system for regulating motoring current and for controlling circulating currents in a single phase motor.

In addition to current regulation, the control circuit 122 of motor system 100 provides regulation of the rail, or inverter, voltage across upper rail 144 and lower rail 146 of the power supply link via a rail regulator circuit 170. As will be described in detail below, the rail regulator circuit 170 is connected between the upper and lower rails 144, 146 of the power supply link. The power supply link also includes at least one rail capacitor (not shown in FIG. 1) between upper rail 144 and lower rail 146. Rail regulator circuit 170 compares the rail voltage across the rail capacitor to a voltage threshold and operates to limit the rail voltage by discharging the rail capacitor when the rail voltage exceeds the voltage threshold. Commonly assigned U.S. Pat. No. 5,513,058, the entire disclosure of which is incorporated herein by reference, discloses a dc link circuit providing rail regulation for dissipating overvoltage conditions in the power supply link.

According to the invention, control circuit 122 is responsive to a disable signal for disabling operation of motor 102 in the event of certain undesirable conditions. In response to the disable signal, control circuit 122 generates an appropriate motor control signal to control the power switches so that lower power switches 152, 154 become conducting and upper power switches 148, 150 become nonconducting, or vice-versa. Thus, winding 138 is de-energized (i.e., shorted) to disable operation of motor 102 and to prevent the motor back EMF from charging the rail. In this instance, control circuit 122 turns on lower switches 152, 154 (or upper switches 148, 150) to shut down motor 102 for halting rotation of rotor 106 and to protect the rail from overvoltage rather than as part of a typical braking scheme.

As shown in FIG. 1, control circuit 122 includes overvoltage and undervoltage circuits 172 for generating the disable signal to disable motor 102 in the event of an undesirable overvoltage or undervoltage condition, respectively. The overvoltage and undervoltage circuits 172 will be described in detail below with respect to FIG. 3G. In a preferred embodiment of the invention, control circuit 122 also includes a lid detection circuit 174 receiving and responsive to the lid position signal via line 176 from the lid switch 118. According to the invention, the lid detection circuit 174 also generates the disable signal for disabling operation of motor 102 when the tub lid of laundry machine 114 is open. Lid detection circuit 174 will be described in detail below with respect to FIG. 3D. As such, overvoltage and undervoltage circuits 172 and lid detection circuit 174 constitute circuits for selectively generating a disable signal. Control circuit 122, responsive to these circuits, shuts down motor 102 as long as the disable signal is present.

Now referring to the schematic diagrams of FIGS. 3A–3N, various aspects of control circuit 122 will be described in greater detail.

As described above, lid switch 118 included in washing machine 114 provides a signal which indicates whether the machine's lid is in its open or closed position. It is contemplated that the lid position signal is either a low (i.e., zero) voltage signal or a line voltage signal when lid switch 118 is open (i.e., the lid is open) and approximately one-half the rail voltage when lid switch 118 is closed (i.e., the lid is closed), depending on the configuration of switch 118 as connected by the original equipment manufacturer (OEM). For example, the OEM may connect a water pump (not shown) in series with lid switch 118. In this situation, opening the lid results in line voltage L1 (see FIG. 3A), alternating as a function of the line frequency, being presented at the LID terminal of lid detection circuit 174 (see FIG. 3D). On the other hand, if the water pump is not connected to lid switch 118, the lid position signal will be zero (open circuit) when the lid is in its open position. Advantageously, the present invention detects either type of lid position signal by comparing the neutral line voltage with the signal presented to the LID terminal.

Figure 3A:
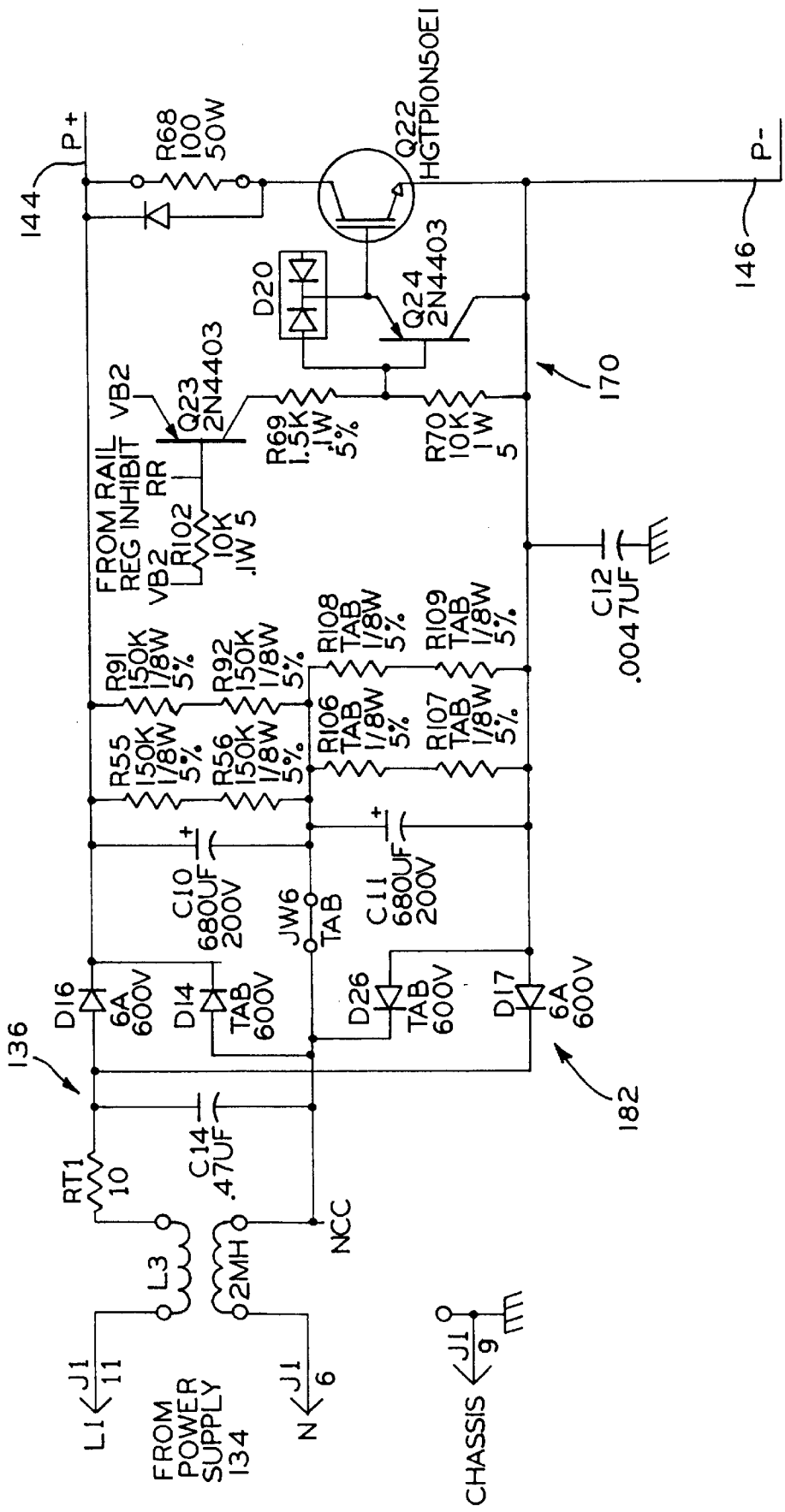
Figs. 3A–3N are schematic diagrams illustrating a control circuit for controlling the motor of FIG. 1.

As shown in FIG. 3D, lid detection circuit 174 includes dual detection circuitry in the form of transistors Q20 and Q25 with their associated resistor networks R63–R66, R78, R79, R81, R82 and R71–R73, R75, R83, R84, R86, respectively. The voltage at NCC (see FIG. 3A) is approximately one-half the rail voltage (e.g., 150 volts dc). For example, FIG. 3A illustrates a voltage doubler circuit 182 which includes diodes D16, D17 and rail capacitors C10, C11 for providing the voltage NCC at approximately one-half the rail voltage across both rail capacitors C10, C11. Preferably, the value of resistor R81 is less than half that of resistor R63 and the value of resistor R86 less than half that of resistor R75. This establishes a threshold at which transistors Q20 and Q25 turn on when the LID terminal voltage is less than half of the voltage at NCC. Thus, in the event that a water pump is connected to line voltage terminal L1 and lid switch 118 is open, the voltage at the collectors of transistors Q20 and Q25 will pulled up once every line cycle. On the other hand, the voltage will remain relatively steady (e.g., one-half the rail voltage) when lid switch 118 is closed. Thus, transistors Q20 and Q25 constitute a comparator circuit for comparing a level of the lid position signal to a voltage threshold.

According to the invention, lid detection circuit 174 provides the disable signal via transistor Q20 to an input L7 of microcontroller 160 when the lid is in its open position. In addition, lid detection circuit 174 provides a direct hardware path for the disable signal (referred to as LIDD) to ASIC 162 via transistors Q25 and Q26. In response to the disable signal generated by lid detection circuit 174, control circuit 122 generates an appropriate motor control signal to control the power switches so that lower power switches 152, 154 become conducting and upper power switches 148, 150 become nonconducting, or vice-versa. In this manner, winding 138 is de-energized (i.e., shorted) to disable operation of motor 102. As such, control circuit 122 is rapidly responsive to a high voltage at the respective collectors of transistors Q20 or Q25 to shut down operation of motor 102.

Following an open lid condition, control circuit 122 re-initiates operation of motor 102 only after an interval of time greater than one cycle of the line voltage (e.g., 17 milliseconds at 60 Hz) passes. In one preferred embodiment, lid detection circuit 174 includes a timer circuit 184 comprised of the transistor Q26 and an RC time delay (i.e., resistor R74 and capacitor C16) for timing the interval. In addition, microcontroller 160 executes a timing routine that activates an interrupt at a high transition and resumes operation only after the appropriate interval of continuous low at input L7 of microcontroller 160 (which indicates that transistor Q20 is off because lid switch 118 is closed). In other words, control circuit 122 inhibits the disable signal when the lid position signal level is greater than the voltage threshold for the timed interval.

By providing redundant detection circuitry in lid detection circuit 174, the present invention minimizes the risk that component failure will result in an open lid condition being undetected.

Figure 3F:
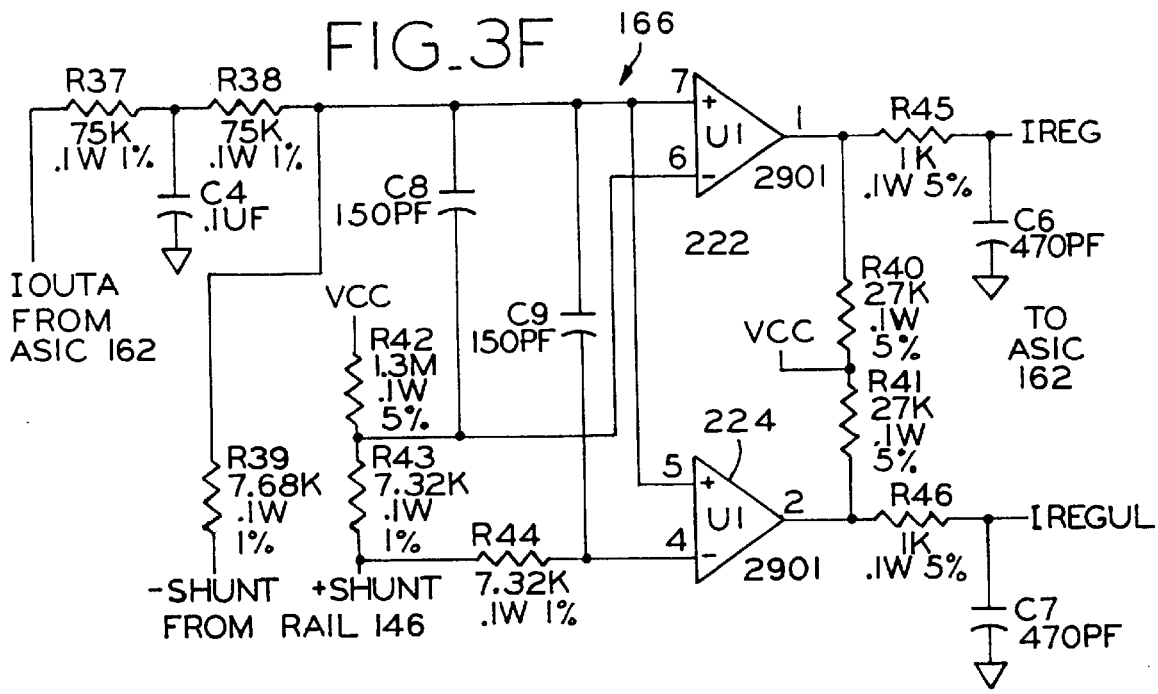
Figure 3G:
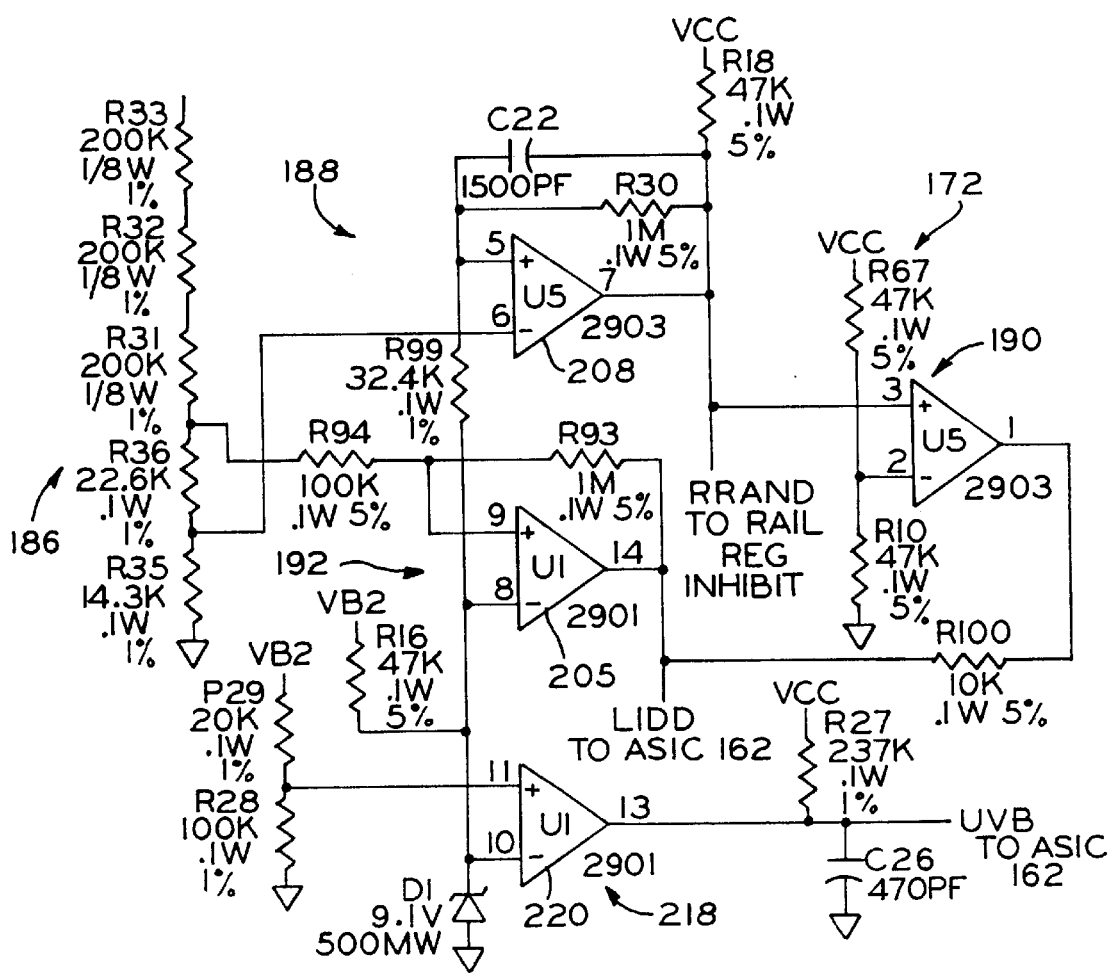
Figure 31:
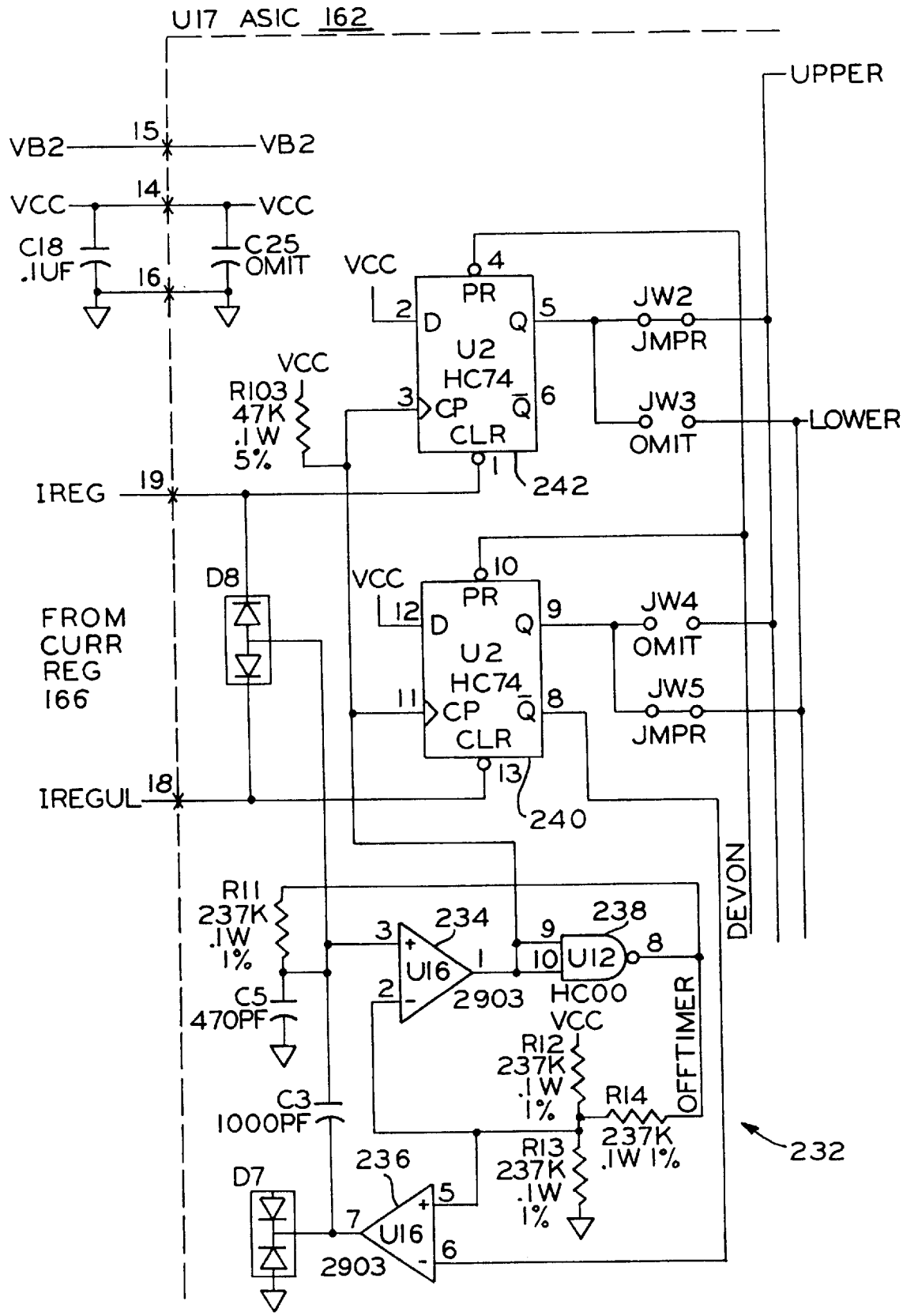

Referring now to FIG. 3G, overvoltage and undervoltage circuits 172 also provide the disable signal for disabling motor 102 in the event of an overvoltage or undervoltage condition. In a preferred embodiment, circuits 172 include a rail voltage sensing circuit 186 for sensing a rail voltage between upper rail 144 and lower rail 146 of the power supply link and providing a rail voltage signal representative of the sensed rail voltage. As shown in FIG. 3G, the voltage sensing circuit 186 consists of a divider network R35, R36, R31, R32, R33 having hysteresis resistors R93, R94. A rail overvoltage detector circuit 188 of circuits 172 compares the rail voltage signal to an overvoltage reference. In turn, the rail overvoltage detector circuit 188 provides an overvoltage signal when the rail voltage signal is greater than the overvoltage reference. According to the invention, circuits 172 include a delay circuit 190 associated with overvoltage detector circuit 188. As will be described in detail below, the delay circuit 190 (including capacitor C22) times a delay interval in response to the overvoltage signal. Rail overvoltage detector circuit 188 then generates the disable signal as a function of the overvoltage signal only after delay circuit 190 times the delay interval.

In a similar manner, circuits 172 also include a rail undervoltage detector circuit 192 which compares the rail voltage signal to an undervoltage reference. In this instance, the rail undervoltage detector circuit 192 generates the disable signal when the rail voltage signal is less than the undervoltage reference. As before, control circuit 122 is responsive to the disable signal provided by either overvoltage circuit 188 or undervoltage circuit 192 for generating an appropriate motor control signal so that lower power switches 152, 154 become conducting and upper power switches 148, 150 become nonconducting, or vice-versa, to de-energize winding 138.

In a preferred embodiment, control circuit 122 effects shutdown of motor 102 in response to the disable signal by shorting winding 138 via lower power switches 152, 154. Although control circuit 122 could also de-energize winding 138 by shorting it through upper switches 148, 150, for clarity, the following description of various aspects of the invention makes reference to the use of lower power switches 152, 154, for shorting winding 138 in response to the disable signal.

With respect to the shutdown response, it is to be understood that motor 102 is capable of operating in a hyperspeed, or overspeed, range. As is known in the art, hyperspeed motor operation occurs at speeds wherein the back EMF of winding 138 exceeds the rail voltage between upper rail 144 and lower rail 146. As an example, the hyperspeed range for motor 102 is approximately 4000 RPM and higher and is particularly well suited for spin operation of washing machine 114. Unfortunately, employing hyperspeed for spin operation increases the risk associated with a loss of control of the current if a shutdown of the control electronics occurs. Since the back EMF exceeds the rail voltage in hyperspeed operation, the back EMF will charge the rail capacitors C10, C11 to the value of the back EMF (which may exceed the voltage rating of the power electronics of motor 102) if control circuit 122 stops the operation of power switches 132. All of the energy of the spinning load is available for this result. Advantageously, the present invention provides current regulation during the shutdown response to prevent damage to motor 102 in this situation.

In FIG. 3A, rail regulator circuit 170 is shown interposed between upper rail 144 and lower rail 146 of the power supply link. According to the invention, rail regulator circuit 170 includes transistors Q23, Q24, Q22 and power resistor R68 and cooperates with rail overvoltage detector circuit 188 (see FIG. 3G) to regulate relatively modest amounts of energy directed to the power supply link during an agitation cycle. In the illustrated embodiment, the transistor Q22 remains on in response to a rail overvoltage condition until the rail voltage, indicated P+, drops approximately 15–16 volts. FIG. 3A also illustrates line 136 according to one preferred embodiment of the invention for connecting motor system 100 to power supply 134. In the illustrated embodiment, line 136 includes an electromagnetic interference filter C14, C12 and L3, as well as rail capacitors C10 and C11.

To manage the shutdown of a spinning basket 112 within, for example, seven seconds, control circuit 122 need only remove the driving torque of motor 102 and engage a mechanical brake. To protect the drive electronics from continued spinning of the load and rotor 106, control circuit 122 turns on the two lower power switches 152, 154 to effect a short of the back EMF through the motor winding impedance. This is acceptable because the relatively high inductance of winding 138 maintains the current below the demagnetization level of motor 102 in steady state.

However, the magnitude of current at the instant both lower switches 152, 154 are turned on is a function of the synchronization of the shutdown response to the position of rotor 106. Thus, if the activation of lower switches 152, 154 is allowed to proceed at any instant of rotation (i.e., without regard to the position of rotor 106), transient current develops that will potentially cause demagnetization of the rotor ferrite magnets (especially at low temperature). As will be described below, control circuit 122 advantageously provides regulation of the shutdown currents after lower switches 152, 154 are activated to prevent damaging motor 102.

Figure 4A:
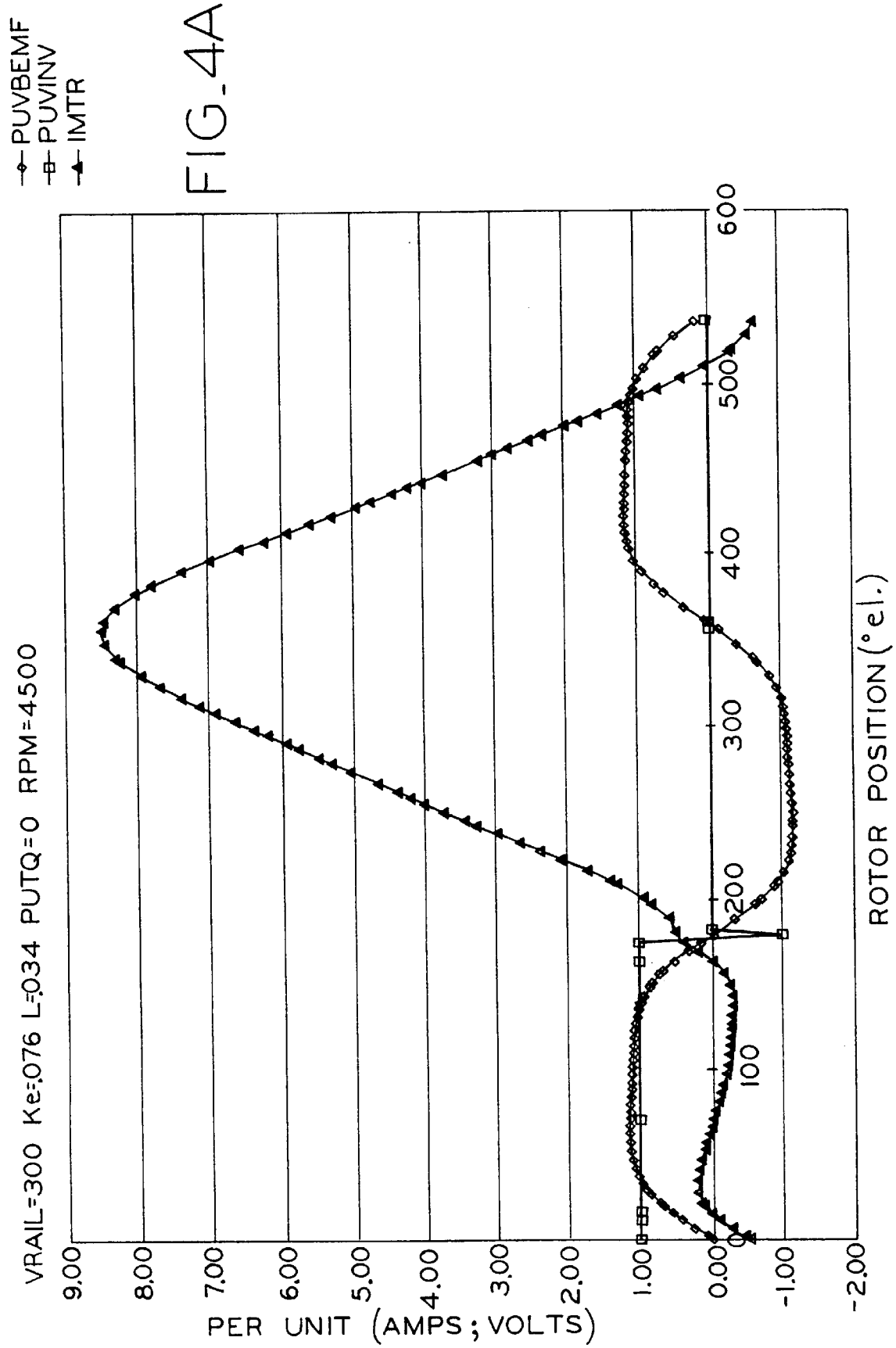

FIG. 4A is an exemplary graph illustrating the undesirable effect of activating lower switches 152, 154 without the benefit of current regulation according to the present invention. As shown, lower switches became conducting at a rotor position of approximately 180° (electrical) with a relatively low value of motor current present at activation. The graph shows a transient current peak of approximately 8.5 amps at a rotor position of 360° (electrical). As is known in the art, the motor current includes a dc component in this situation which decays to zero over the subsequent rotations of rotor 106. Although the peak to peak current remains the same (e.g., approximately 9.0 amps in FIG. 4A) over time, the peak current decreases to approximately 4.5 amps, for example, in steady state. In this example, however, partial demagnetization occurs at the instant the motor current exceeds a demagnetization threshold of approximately 6.17 amps.

As described above, hyperspeed occurs where the back EMF exceeds the rail voltage. At 4500 RPM, the per unit values of the back EMF and inverter voltages are nearly in phase as shown in FIG. 4A. FIG. 4B illustrates these voltages at 12000 RPM. At higher speeds, the rail voltage (shown as per unit inverter voltage, PUVINV) may be controlled to lead the back EMF (shown as per unit back EMF, PUBEMF).

Referring again to the schematic diagrams of FIGS. 3A–3N, ASIC 162 effectively combines the disable signals provided by lid detection circuit 174, overvoltage circuit 188 and undervoltage circuit 192 as the signal, LIDD. As shown in FIG. 3L, a NAND gate 194 goes high at its output in response to the disable signal. As a result, ASIC 162 instructs upper switches 148, 150 to turn off and lower switches 152, 154 to turn on. In this instance, a resistor R95 and a capacitor C21 provide a time delay of approximately 10 microseconds so that all four switches 148, 150, 152, 154 are momentarily off before lower switches 152, 154 turn on to prevent shoot-through currents. Thus, the RC circuit of resistor R95 and capacitor C21 constitute a circuit for delaying lower switches 152, 154 from becoming conducting in response to the disable signal until after upper power switches 148, 150 become nonconducting. In other words, a transition signal, TRANB, goes low in response to the disable signal for 10 microseconds which causes a NAND gate 196 to go high at its output. In turn, the high level at the output of gate 196 causes the output of a NOR gate 198 (see FIG. 3K) to go low which turns off switch 154 and causes the output of a NOR gate 202 (see FIG. 3J) to go low which turns off switch 152. In a similar manner, the high level at the output of gate 196 causes the output of a NOR gate 203 (see FIG. 3K) to go low which turns off switch 150 and causes the output of a NOR gate 204 (see FIG. 3J) to go low which turns off switch 148. After the time delay, TRANB goes high which turns on the lower switches 152, 154.

Referring now to FIGS. 3G and 3L as they pertain to rail undervoltage detector circuit 192, an open collector comparator 205 of rail undervoltage detector circuit 192 (see FIG. 3G) compares a reference voltage provided by a zener diode D1 to the voltage sensed by voltage sensing circuit 186. When the sensed voltage is less than the reference, undervoltage circuit 192 provides the disable signal (i.e., LIDD) at the output of comparator 205 to one input of NAND gate 194 through a resistor R15. Thus, the undervoltage condition is treated the same as an open lid condition for purposes of disabling motor 102. A resistor R80 combined with the resistor R15 provides positive feedback to ensure that this NAND circuit does not oscillate near its switch point. According to the invention, the resistors R80 and R15 cause the low presented to one input of gate 194 to be pulled lower than the device threshold (e.g., ½ VCC or 2.5 volts). Without resistor R15, a high at the output of an XNOR gate 206 would tend to pull up the input to gate 194. As such, resistor R15 ensures that the input of gate 194 is lower than the device threshold when LIDD is low. After gate 194 goes high at its output (i.e., after its input goes below the device threshold), the low at the output of gate 206 brings the input of gate 194 lower to prevent oscillation near the device switch point.

Advantageously, rail undervoltage protection as described herein prevents the rail voltage from quickly collapsing to zero during operation if the power is interrupted. Without undervoltage protection, the circuit response during spin operation would be to turn off of all power switches 132 which would result in the relatively high back EMF recharging the rail. Control circuit 122 would then attempt to rapidly discharge the rail to resume operation Thus, activating lower switches 152, 154 to initiate an undervoltage shutdown greatly reduces the cycles of rail discharge and recharge which can potentially damage motor 102.

Overvoltage initiated shutdown by activation of lower switches 152, 154 prevents the rail voltage shunt regulator resistor R68 from being overloaded. As described above, delay circuit 190 of FIG. 3G times a delay interval in response to the overvoltage signal. Rail overvoltage detector circuit 188 then generates the disable signal as a function of the overvoltage signal only after delay circuit 190 times the delay interval. Delay circuit 190 includes a resistor R100 which limits the current to discharge a capacitor C16 to the threshold of gate 194 (see FIG. 3L) as influenced by the resistors R15 and R80 (see FIG. 3L) to effect the delay. Such a delay is desired for a washing machine application requiring some regenerative braking during the agitate cycle.

As an example, if R100 is 10 kΩ, delay circuit 190 provides a nominal 5 millisecond delay interval before shutdown activation. During this 5 millisecond transient period, rail regulator 170 manages the current. If rail regulate resistor R68 is 100 Ω and a 50 watt rating, this interval requires the absorption of 8.5 Joules. If the circuit were to be cycled at the maximum rate, however, resistor R68 would have to manage 132 watts. Although this is greater than the 50 watt rating of resistor R68, such a resistor is able to handle 132 watts for a relatively short amount of time. Further, 132 watts is well below the peak load of approximately 1600 watts which would result if control circuit 122 turned off all four switches 132 at the same time.

Referring further to FIG. 3L, control circuit 122 employs a transistor Q8 as an AND logic element to prevent rail regulator 170 from continuing to discharge rail capacitors C10, C11 after lower switches 152, 154 are activated. In the embodiment shown, rail capacitors C10, C11 are rated at 200 volts each, for example, so the rail regulation threshold is set at approximately 400 volts. At initial overvoltage, a low at the output of a comparator 208 (see FIG. 3G) enables the turn on of transistor Q8 by sinking current from its emitter through a resistor R101. In this instance, the base of transistor Q8 is at 5 volts due to the logic levels at the outputs of a NOR gate 210, an XNOR gate 212 and an XNOR gate 214 as well as the logic levels at the outputs of gate 194 and gate 196. Applying 5 volts at the base of transistor Q8 enables the turn on of the transistor Q23 (see FIG. 3A) of rail regulator 170 at its base connection RR and enables the turn on of the transistor Q22 through the resistor R69 and diode D20. After the delay imposed by resistor R100, the low at the input of gate 194 causes a high at its output which results in a low at the output of NOR gate 210 which is connected to the base of transistor Q8. This low at the base of transistor Q8 then shuts down rail regulator 170. Additionally, rail regulator 170 is protected from operation at less than the required gate drive voltage by the action of a logic supply undervoltage detector 218 comprising a comparator 220 cooperating with gate 212, gate 196 and gate 210. The XNOR gate 214 in combination with resistor R95 and capacitor C21 provides an additional transition inhibit required for the momentary turn off of all power switches 132 before activation of lower switches 152, 154.

Thus, transistor Q8 and resistor R101 constitute a rail regulator inhibiting circuit responsive to the disable signal for inhibiting rail regulator circuit 170 from operating when winding 138 is being de-energized for disabling motor 102.

As is known in the art, regenerative braking causes energy to be returned to the rail which may cause an overvoltage condition at P+of rail 144. It is to be understood that in certain applications, particularly those not requiring regenerative braking, it may be desired to eliminate rail regulator 170. In an alternative embodiment, the value of resistor R100 is 1 Ω, for example, which removes the interval of time in which rail regulator 170 operates.

Referring now to FIG. 3F, current regulation circuit 166 preferably includes a pair of comparators 222, 224 as well as a resistor-capacitor network consisting of resistors R37, R38 and R39 and capacitor C4. In the illustrated embodiment, control shunt Rs constitutes a current sensing circuit for sensing current in the power supply link. In this instance, current regulation circuit 166 compares the sensed current, as represented by ±SHUNT, to a regulated current level representative of a desired speed and/or torque of motor 102 (i.e., IOUTA). Current regulation circuit 166 provides a current regulation signal IREG representative of the comparison at its output. As described above, control circuit 122 is responsive to the current regulation signal for controlling power switches 132 to pulse width modulate the power provided to winding 138 at a duty cycle which is a function of the regulated current level thereby regulating the motor current in winding 138 to control the speed and/or torque of motor 102.

According to the invention, current regulation circuit 166 also acts to regulate current during a shutdown response by pulse width modulating the two active switches (i.e., lower switches 152, 154) simultaneously. To enable the regulation of the current produced by the activation of lower switches 152, 154 during a shutdown response, the current is routed through the control shunt $R_{SHUNT}$ (i.e., resistors R57, R58, R59, R98 of FIG. 3B) by rectifiers D24 and D25 (see FIGS. 3M and 3N, respectively) by their connection to S-. For this regulation to be effective at limiting motor current without overcharging the rail capacitance C10, C11, the current is regulated at the highest peak regulate current value. Whereas microcontroller 160 controls current regulator 166 for normal operation, ASIC 162 intervenes to set the current regulation level to its highest level during a shutdown response. Control circuit 122 accomplishes this by routing the PWM signal IOUT at the output L6 of microcontroller 160 to ASIC 162 at one input of a NOR gate 228 (see FIG. 3L). This input of gate 228 is brought high when lower switches 152, 154 are activated for shutdown of the drive. The output of NOR gate 228 is brought low, an XNOR gate 230 inverts the low to a high, and a 100% PWM signal (i.e, the highest peak regulation level) is supplied to current regulator 166. In this manner, control circuit 122 prevents overcharging of the rail during the PWM off intervals.

Referring to FIG. 5A, an exemplary graph shows regulation of the motor current by current regulation circuit 166 during a shutdown response according to the present invention. In this example, control circuit 122 activated lower switches 152, 154 in response to the disable signal at approximately 180° (electrical). Regulation following activation of lower switches 152, 154 by pulse width modulating both conducting switches 152, 154 began when the motor current reached the 100% peak regulate value of approximately 4.6 amps, for example. As shown, the regulation activity began at approximately 270° (electrical) and continued until approximately 360° (electrical) when the level of transient current finally decayed to a level at which the motor current dropped below the current threshold.

Figure 5B:
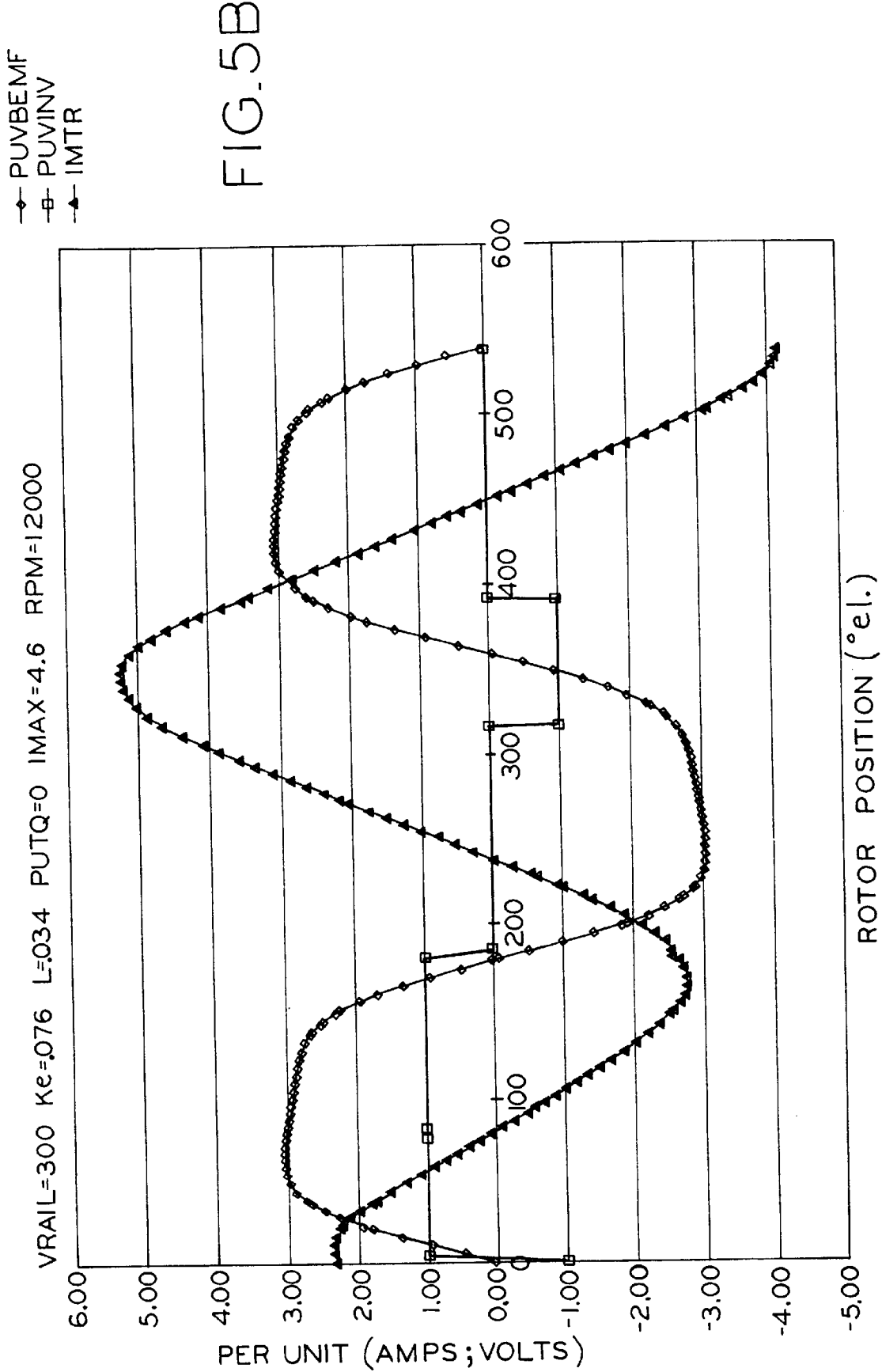

Similarly, FIG. 5B is an exemplary graph of the regulated motor current with motor 102 operating at approximately 12000 RPM. As shown, control circuit 122 activated lower switches 152, 154 in response to the disable signal at approximately 180° (electrical) and began current regulation at approximately 320° (electrical). In this instance, however, the current did not fall below the regulate level until approximately 390° (electrical). Therefore, the conducting switches 152, 154 essentially remained off for the entire regulation interval. In other words, the PWM duty cycle was 0%.

Referring now to FIG. 6, a graph of the peak transient current at initial motor currents ranging from 0 to 4.6 amps (expressed on the X axis as per unit torque) and speeds ranging from 500 RPM to 12000 RPM shows the effect of regulation according to the present invention. As is apparent from this graph, control circuit 122 advantageously prevents the current in motor 102 from exceeding the demagnetization threshold of rotor 106.

Referring again to current regulation circuit 166 of FIG. 3G, current regulation circuit 166 preferably includes comparator 222 for normal current regulation and includes comparator 224 for detecting currents in excess of the intended regulate value by a predetermined amount. Comparator 222 compares the sensed current in the power supply link (i.e., the current in $R_{SHUNT}$) to the regulated current level routed through ASIC 162, as represented by IOUTA. Comparator 222 then generates the current regulation signal IREG as a function of the comparison. In turn, control circuit 122 receives the signal IREG and generates the commutation signal as a function thereof to effect current regulation in system 100. Independent of the current regulation function, comparator 224 compares the current in $R_{SHUNT}$ to the maximum current level, a reference which is set at a level higher than the highest regulate value by a predetermined amount (e.g., 0.5 amps). Current regulation circuit 166 provides an overcurrent signal when the current in shunt resistor $R_{SHUNT}$ exceeds the maximum level, as determined by comparator 224. In response, control circuit 122 causes both active switches (e.g., upper switch 148 and lower switch 154 or upper switch 150 and lower switch 152) during motoring operation to be pulse width modulated rather than only one of the switches. As such, comparator 224 constitutes an overcurrent detector circuit.

In a preferred embodiment, current regulation circuit 166 includes resistor-capacitor networks R39, C8, and R45, C6 for filtering of diode recovery current. In this manner, current regulation circuit 166 ensures a minimum on time that allows for the discovery by comparator 224 of current that exceeds the highest regulate value by 0.5 amps. Current regulation circuit 166 also has diode recovery current filtering provided by resistors R39, R44 and capacitor C9 on the input to comparator 224 and resistor R46 and capacitor C7 on the output.

In the event that both upper and lower power switches 132 are being used for pulse width modulation of the motor current, control circuit 122 preferably provides an increased PWM off interval. FIG. 3I illustrates an off timer circuit 232 which includes comparators 234, 236 and an inverter 238 for limiting the switching rate in this situation. When the comparator 236 turns on, off timer circuit 232 adds a capacitor C3 across a capacitor C5 which triples, for example, the circuit's time constant. As such, control circuit 122 ensures that the PWM switching rate provides off intervals which are long enough for circulating currents to decay. In this instance, a DFF 240; responsive to the output of comparator 224 included in current regulation circuit 166, initiates the increased off time by causing comparator 236 to be clamped low. The combination of capacitor C3 and capacitor C5 discharges through a diode D8 to initialize the timing interval when the output of either comparator 222 or comparator 224 is low. When comparators 222, 224 are both high, then the timing begins. When the charge of capacitor C5 reaches the threshold at comparator 234, the off time interval ends. As shown in FIG. 3I, a high transition at the output of comparator 234 clocks both the lower DFF 240 as well as an upper DFF 242.

As described above, control circuit 122 commands commutation of motor 102 as a function of the back EMF of winding 138. In general, commutation occurs approximately in phase with the back EMF when motor 102 is driving a load at relatively low speeds. As the motor speed increases, however, the back EMF increasingly opposes the buildup of current in winding 138. As a result, control circuit 122 advantageously commutates winding 138 before the back EMF zero crossing to obtain maximum torque. According to the invention, microcontroller 160 calculates an advance time for commutation as a function of the commanded current regulate level based on the position signal provided by position sensor 156.

In one preferred embodiment, microcontroller 160 causes commutation instances to occur after a detected back EMF zero crossing as a function of a delay interval $T_d$ which is defined in microseconds by:

$$T_d = COMPER - ADV$$

where COMPER is an elapsed time between two previous commutation instances in microseconds and ADV is an advance interval which is a function of a desired speed and/or torque of motor 102.

Microcontroller 160 defines the advance interval ADV in microseconds by:

$$ADV = COMPER * IOUT / K_{ADV}$$

where IOUT is the regulated current level representative of the desired speed and/or torque of motor 102 and $K_{ADV}$ is a motor dependent constant As an example, IOUT is an eight bit number from 0–255 where 255 corresponds to full current and $K_{ADV}$ is approximately 500.

According to the invention, microcontroller 160 limits the value of COMPER by setting it equal to a constant XOVER when COMPER is greater than or equal to XOVER. In this instance, the constant XOVER is approximately the commutation period at which the back EMF of motor 102 equals the supply voltage. In other words, microcontroller 160 replaces COMPER with XOVER when motor 102 is operating below hyperspeed. For example, if the crossover from normal to hyperspeed operation occurs at 4000 RPM, then XOVER is approximately 1250 microseconds which is the commutation interval for a 12 pole single phase motor at that speed. Thus, if microcontroller 160 commands 50% current and $K_{ADV}$ is 500, then ADV is a constant 320 microseconds at or below 4000 RPM. At speeds greater than 4000 RPM, ADV is a function of the speed of motor 102. For example, the commutation interval is approximately 400 microseconds at 12000 RPM. Thus, ADV is approximately 100 microseconds at 12000 RPM and 50% commanded current. In other words, ADV is dependent only on the commanded current when operating below hyperspeed and is dependent on the commanded current and motor speed at hyperspeed.

In one preferred embodiment, position sensor 156 provides a position signal that has a transition, or edge, occurring each time rotor 106 rotates 180° (electrical). Preferably, each transition of the position signal corresponds to a zero crossing of the back EMF of winding 138. As shown in FIG. 7, which compares an exemplary position signal in FIG. 7(a) to an exemplary drive output in FIG. 7(b), the interval between each detected zero crossing and the next estimated zero crossing is alternately defined by (A'+A) and (B'+B) where (A'+A) is considered an odd interval and (B'+B) is considered an even interval Particularly during hyperspeed operation, however, the odd and even intervals of the position signal tend to not be equal. For example, if position sensor 156 comprises a Hall device which senses the position of the rotor magnets, then variation in the flux trip point of the device causes its output to become asymmetrical, particularly at relatively high motor speeds. As the speed of motor 102 increases above its no load speed (i.e., the generated back EMF exceeds the supply voltage), the peak current attainable becomes increasingly limited by the winding inductance and generated back EMF. For much of the operation in this hyperspeed region, the peak current may actually be below the setpoint of the current limiting circuitry of control circuit 122 and controlled only by the commutation timing of motor 102. Thus, if the drive output states, or commutation intervals, are not of equal length, then a net dc component is applied to motor winding 138 which produces heating but does not produce any additional torque. If this dc component is large enough, then the current swing will encounter the current limit in one direction, curtailing the swing and the resulting in loss of torque.

According to one preferred embodiment of the invention, control circuit 122 generates the motor control signal for controlling power switches 132 to cause commutation instances to alternately occur after the detected zero crossings by an interval A' and an interval B', the intervals A' and B' being defined by:

$$A' = T_d - T_{ofs};$$

and $$B' = T_d + T_{ofs}$$

where $T_{ofs}$ is a variable for reducing the asymmetry, the asymmetry being defined by (A'+B)−(B'+A), between adjacent commutation intervals.

Substituting for A' and B', the asymmetry is defined by:

$$(-T_{ofs} + B) - (T_{ofs} + A);$$

or $$(B-A) - 2 \cdot T_{ofs}.$$

According to the invention, microcontroller 160 stores $T_{ofs}$, in its memory and occasionally updates the stored value of $T_{ofs}$, until the asymmetry between adjacent commutation intervals is zero. For example, microcontroller 160 updates the variable $T_{ofs}$ every N commutation intervals by incrementing or decrementing its value, beginning at zero.

Referring now to FIG. 8, microcontroller 160 executes a routine every 130 milliseconds, for example, for adjusting $T_{ofs}$ to reduce the inequality between the odd and even commutation intervals. Microcontroller 160 first subtracts the value of A from the value of B and stores (B−A) in memory at step 246. At step 248, microcontroller 160 then retrieves $T_{ofs}$ from memory, multiplies it by two and then subtracts $2 \cdot T_{ofs}$, from (B−A). If the asymmetry calculation is positive, as determined at step 250, microcontroller 160 proceeds to step 252 for incrementing $T_{ofs}$ by one. On the other hand, microcontroller 160 decrements $T_{ofs}$, by one at step 254 if the asymmetry calculation is negative.

With respect to sensing the position of rotor 106, position sensing circuit 156 preferably includes a 0°, or direct, Hall sensor H1 and a 90°, or quadrature, Hall sensor H2. In this instance, the Hall sensor H1 provides a position signal which is generally in phase with the back EMF of winding 138 and the Hall sensor H2 provides a position signal which is generally 90° out of phase with the back EMF of winding 138.

Conventional single phase motor controls typically employ a single position sensor for detecting the position of rotor 106. During hyperspeed operation, however, advance angle operation is required to build up current in motor winding 138 to sustain current and torque as the back EMF increases above the rail voltage. Although the current magnitude during hyperspeed operation may equal that lower speed operation, the current which is out of phase with the back EMF reduces the average torque produced by motor 102. For this reason, accurate position sensing is critical for commutating winding 138 at the proper instance. The time delay for a desired advance angle may be computed from the direct Hall signal by inference from the previous 180° rotation interval, but the use of a single position sensor becomes problematic during acceleration or deceleration. For this reason, the present invention advantageously includes the quadrature position sensor H2 in addition to the direct position sensor H1 for improving the estimation of the next zero crossing.

As is known in the art, single phase motors produce a modulated torque output at their shafts. This modulation produces relatively small regions in which no torque can be produced. These regions, referred to as null torque regions, generally correspond to the zero crossings of the back EMF. When such a motor drives a load at low speed, the polarity of current applied to its winding is typically operated in phase with the position signal and, thus, in phase with the generated back EMF. The motor's control switches the winding at or near the back EMF zero crossing of the back EMF which is a null torque region. As such, inaccuracies in rotor position sensing may result in a small angle in which the torque is opposite the desired direction of rotation. If the rotor is moving, its momentum will carry it through this angle. On the other hand, if the rotor is stopped or decelerating to accomplish a reversal, the rotor may become trapped in the null torque region and oscillate inside this angle.

Advantageously, system 100 provides improved motor reversals through the use of the two position sensors H1, H2. According to the invention, microcontroller 160 decodes the two position signals to determine the actual direction of rotation and control circuit 122 commutates motor 102 to repel rotor 106 away from the null torque regions.

When system control 120 commands a reversal, control circuit 122 first turns off the current to winding 138 to reduce the speed of motor 102. After the motor speed falls below a preset threshold, microcontroller 160 changes operation of motor 102 from a forward mode to a reversing mode by executing a reversal routine such as the one illustrated in FIG. 9. Commutation of winding 138 generally in phase with the direct position signal defines operation in the forward mode whereas commutation of winding 138 generally in phase with the quadrature position signal defines operation in the reversing mode. Preferably, the speed threshold is selected to give a prompt reversal without incurring excessive supply charging caused by the braking effect of the routine. In the alternative, microcontroller 160 initiates the reversal routine a predetermined amount of time after control circuit 122 turns off the current.

Referring now to FIG. 10, exemplary position signals from direct position sensor H1 and quadrature position sensor H2 are shown in FIG. 10(a) relative to an exemplary motor speed graph in FIG. 10(b) and an exemplary motor current graph in FIG. 10 (c). As shown in FIG. 10, system control 120 commands a reversal at a time indicated by reference character 300. Microcontroller 160 detects transitions, or edges, in the direct and quadrature position signals which are indicative of a direction in which rotor 106 is rotating. If the rotation is not in the final direction, microcontroller 160 switches the polarity of winding 138 in phase with the quadrature position signal instead of the direct position signal. If the current was held constant, the resulting torque would be forward half the time and reverse half the time. According to the invention, control circuit 122 controls power switches 132 in the reversing mode to modulate the motor current so that the forward direction torque is less than the reverse direction torque until rotor 106 reverses direction. For example, microcontroller 160 sets the motor current when motor 102 is producing the forward direction torque to be approximately half of the motor current when motor 102 is producing the reverse direction torque. Thus, the net torque acts to reverse the direction of rotor 106.

When a reversal of rotation is needed, the motor current polarity is commutated so that the direction of the torque is always away from the null torque region. This can be accomplished by allowing the commutations to take place part way between two null torque regions and changing the current magnitude depending on which side of the null torque region rotor 106 is located. The current magnitude is increased after the commutation but before the null region is reached. After the null region is passed then the magnitude of the current is reduced to a much lower level. This modulation of current levels prevents motor 102 from speeding up and biases the slow down of motor 102 in such a way as to make it more probable that a reversal will occur in an area of large torque producing potential.

Following reversal, shown at a time indicated by reference character 302 in FIG. 10, control circuit 122 again switches winding 138 in phase with the direct position signal to provide torque in the final direction. Preferably, operation continues according to the reversal algorithm of FIG. 9 until the third, for example, transition past reversal to ensure the rotor 106 actually reversed before resuming normal operating settings. In FIG. 10, a reversal is indicated between two consecutive quadrature signal transitions, shown at reference characters 304 and 306. Thus, the third transition following knowledge of the reversal at reference character 306 is the direct signal transition at reference character 308. Although shown with respect to the quadrature signal, it is to be understood that a reversal may also be indicated by two consecutive direct signal transitions. However, in the situation of consecutive direct signal transitions, the reversing mode continues for a time to until the quadrature signal indicates a reversal to ensure that rotor 106 is rotating in the new direction.

Referring again to FIG. 9, a preferred routine for reversing rotor 106 according to the invention begins at step 350. At step 350, microcontroller 160 receives direction bits from quadrature position sensor H2. If the reversing routine is enabled at step 352, i.e., a reversal has been commanded and the speed of motor 102 has reached the threshold, microcontroller 160 proceeds to step 354. At step 354, microcontroller 160 detects transitions in the direct and quadrature position signals which are indicative of a direction in which rotor 106 is rotating. If the rotation is not in the final direction as of the most recent position signal edge, microcontroller 160 determines at step 356 whether a change polarity flag CHGPOL is set. According to the invention, CHGPOL is set by two consecutive edges from the same Hall sensor H1 or H2. If CHGPOL is not set, microcontroller 160 proceeds to step 358 for clearing a recover through quadrature flag QREC before setting the desired motor current IOUT to a level I2BACK at step 360. Following step 360, microcontroller 160 sets the quadrature mode QMODE at step 362 which sets the output state before exiting. If CHGPOL is set, microcontroller 160 proceeds directly to steps 360 and 362. In this routine, the quadrature mode QMODE commands control circuit 122 to commutate winding 138 in response to the quadrature position signal rather than the direct position signal. Further, the QREC flag is set by the second of two consecutive direct signal transitions and indicates that the next event, or transition, will be a quadrature signal edge in the final direction. In other words, QREC extends the quadrature commutation mode by another commutation. Preferably, the current level I2BACK is selected to provide a relatively large amount of torque in the reverse direction for rapid reversal and is equal to a master reversing current value, REVCUR.

On the other hand, if microcontroller 160 determines at step 354 that motor 102 is rotating in the final direction as of the most recent position signal edge, it proceeds to step 366 to again determine whether the change polarity flag CHGPOL is set. If so, microcontroller 160 proceeds directly to step 368 for setting the commanded motor current to a level IRECQ, which is preferably equal to REVCUR. At step 368, microcontroller 160 also sets a torque polarity flag TDIR to the objective, or new, direction OBJDIR. At this point, microcontroller 160 proceeds to step 372 for clearing the quadrature commutation, or reversing, mode which sets the output state before exiting.

Referring again to step 366, if CHGPOL is not set, then microcomputer 160 checks the quad recover flag QREC at step 376. If QREC is set, microcontroller 160 proceeds to step 378 for clearing QREC before setting the desired motor current level to IRECQ and the torque polarity to OBJDIR at step 368. If QREC is not set, microcontroller 160 proceeds to step 382 for checking the speed of motor 102. At step 382, microcontroller 160 determines if the motor speed is approximately zero. If so, microcontroller 160 performs step 368. If not, microcontroller 160 sets the torque polarity TDIR to the objective direction OBJDIR at step 384 and then proceeds to step 386 to determine whether or not a steady direction of rotation has been recognized. If motor 102 is operating in a steady direction, microcontroller 160 considers motor 102 to have properly reversed and, as a result, disables the reversing mode RMODE and disarms a reversing routine flag RPND at step 388. In this manner, the reversing routine causes microcontroller 160 to return to normal steady direction operating conditions. Following step 388, or step 386 if the direction is not yet steady, microcontroller 160 proceeds to step 390 for setting IOUT equal to REVCUR and then proceeds to step 372 for clearing the quadrature mode.

According to FIG. 9, microcontroller 160 is responsive to quadrature signal edges for executing the steps beginning at step 350. In a similar manner, microcontroller 160 is responsive to direct signal edges for executing similar steps beginning at step 392. In this instance, microcontroller 160 commands a motor current which is at a level ONEFWD, defined to be approximately half of I2BACK.

When the reversing routine is enabled at step 394, microcontroller 160 detects transitions in the position signals at step 396 to determine if rotor 106 is rotating in the final direction as of the most recent position signal edge. If not, microcontroller 160 proceeds to step 398 for clearing the recover through quadrature flag QREC before setting the desired motor current IOUT to the level ONEFWD at step 400 and setting the quadrature mode QMODE at step 362. As described above, the current level ONEFWD is preferably much less than the current level I2BACK so that torque in the forward direction is much less than the torque in the reverse direction. FIG. 10(c) illustrates the different current levels as they relate to the commutation interval defined by the quadrature position signal.

On the other hand, if microcontroller 160 determines at step 396 that motor 102 is rotating in the final direction as of the most recent position signal edge, it proceeds to step 402 to determine whether the change polarity flag CHGPOL is set. If so, microcontroller 160 proceeds directly to step 404 for setting QREC. As described above, the QREC flag is set by the second of two consecutive direct signal transitions and indicates that the next event, or transition, will be a quadrature signal edge in the final direction. In other words, QREC extends the quadrature commutation mode by another commutation. Following step 404, microcontroller 160 commands IOUT equal to IRECQ at step 406 and then sets QMODE at step 362.

Referring again to step 402, if CHGPOL is not set, then microcomputer 160 checks the quad recover flag QREC at step 408. If QREC is set, microcontroller 160 proceeds to step 410 for clearing QREC before setting the desired motor current level to IRECQ at step 406. If QREC is not set, microcontroller 160 proceeds to step 412 for checking the speed of motor 102. At step 412, microcontroller 160 determines if the motor speed is approximately zero. If so, microcontroller 160 sets IOUT equal to I2BACK at step 414. If not, microcontroller 160 sets the torque polarity TDIR to the objective direction OBJDIR at step 384.

The reversing routine of FIG. 9 also provides an overflow condition for setting certain reversal parameters in the event that no edges are detected for at least two, for example, clock services. Microcontroller 160 begins the overflow portion of the reversing routine at step 422 and determines whether any edges have occurred in the predetermined interval at step 424.

FIGS. 11–13 regard an alternative embodiment of the present invention in which control circuit 122 shuts down motor 102 in response to the disable signal in synchronism with a steady state estimate of the current rather than regulating the current after activation of lower power switches 152, 154. As described above, the motor current includes a transient dc component when lower switches 152, 154 are both conducting. This transient component normally decays to zero over the subsequent rotations of rotor 106. However, if the current is not regulated, many cycles must normally pass before the motor current decays to its steady state solution. According to the invention, control circuit 122 prevents the occurrence of potentially demagnetizing currents by synchronizing the shutdown response. If lower power switches 152, 154 become conducting when the instantaneous motor current is in proximity with its steady state solution, the current remains essentially at the steady state solution values. As such, if the initial activation lower switches 152, 154 is synchronized by the concurrence of the instantaneous motor current with the continuously updated computed value of the steady state solution, regulation of currents after turn on of lower switches 152, 154 may be eliminated.

According to this alternative embodiment of the invention, microcontroller 160 executes a routine for generating an estimate of the steady state motor current (i.e., after the transient component decays). In response to the steady state current estimate, control circuit 122 synchronizes the shutdown response to the desired position of rotor 106 by causing lower power switches 152, 154 to become conducting and upper power switches 148, 150 to become nonconducting when the motor current approximately equals the steady state estimate. Thus, microcontroller 160 constitutes a processor for generating a steady state estimate of the motor current.

An example of the steady state estimation for a particular motor follows: First, the estimate of the steady state short circuit current assumes sinusoidal voltage of equal average value to the back EMF. In this example, the peak to average value for the back EMF of motor 102 is 1.29617. The equivalent peak sine voltage is then:

$$V_{pk} = RPM \cdot K_e \cdot \pi / (2 \cdot V_{pktavg})$$

where $K_e = 0.076$ peak volts / RPM and $V_{pktvg} = 1.29617$.
The inductive reactance of winding 138 is:

$$Xl = L \cdot 2 \cdot \pi \cdot RPM \cdot p/120$$

where L=0.034 Henries; p=12 poles; Xl=10.68 Ohms at 500 RPM; and Xl=96.13 Ohms at 4500 RPM.

The resistance includes winding 138 and the two lower switches 152, 154: R=4.31 Ohms If resistance is included in the estimate of steady state short circuit current at the activation of lower switches 152, 154, then the peak value and angle of current would have to be computed at every operating speed. For the above values simulations demonstrated that the resistance may be neglected in the synchronization of the turn on of lower switches 152, 154. At low speed where the ratio of resistance to reactance would appear most significant, the transient excursion of current is not significant when the resistance is neglected in the synchronization of the winding short.

By eliminating resistance as a factor, the determination of the steady state solution for synchronization is simplified:

$$\begin{aligned} I_{shrtpk} &= V_{pk}/(R + jXl) \\ &\approx V_{pk}/Xl \\ &= \frac{RPM \cdot K_e \cdot \pi}{(2 \cdot V_{pktavg} \cdot L \cdot 2 \cdot \pi \cdot RPM \cdot p/120)} \\ &= K_e \cdot 30/(V_{pktavg} \cdot L \cdot p) \end{aligned}$$

Thus, $I_{shrtpk}$ is constant for a specific motor. Further, the angle of this current is a constant lagging 90° (electrical).

Preferably, microcontroller 160 executes a routine for calculating the steady state estimate of current with a resolution of three bits. It is contemplated that the steady state estimate may be calculated with a greater resolution. However, a resolution of only three bits provides sufficient accuracy and requires less processing power.

Referring now to FIG. 11, ASIC 162 implements a synchronization circuit 260 according to the invention. The opportunity presented by a resolution of only three bits is an implementation based on microcontroller 160 that dedicates only three bits of a port to drive an R-2R ladder digital to analog conversion network 262. Preferably, microcontroller 160 regularly updates the steady state estimate at the proper angle with respect to the back EMF. In one embodiment of the invention, the synchronization circuit 260 includes two comparators 264, 266 arranged as a window comparator for comparing the shunt current to the analog representation of the steady state current. The window comparator circuit 264, 266 preferably provides a 4% of full scale window. In other words, the output of comparators 264, 266 detects when the motor current is within 0.2 amps, for example, of the steady state estimate. As shown in FIG. 11, synchronization circuit includes a DFF clock circuit 268 clocked by the window comparator output. In this manner, synchronization circuit 260 causes the shutdown response to occur approximately in synchronism with the steady state current, which in turn prevents the current from exceeding the demagnetization threshold of rotor 106. Preferably, the synchronization circuit 260 of FIG. 11 replaces gates 194, 206 and 214 of FIG. 3L.

Referring to FIG. 12, an exemplary graph shows synchronization of the shutdown response according to the present invention. In this example, control circuit 122 activated lower switches 152, 154 in response to the disable signal at approximately 160° (electrical) when the current was within 0.2 amps of the steady state estimate.

FIG. 13 is a graph of the peak transient current at initial motor currents ranging from 0 to 4.6 amps (expressed on the X axis as per unit torque) and speeds ranging from 500 RPM to 12000 RPM and shows the effect of synchronization according to the present invention. As is apparent from this graph, control circuit 122 advantageously prevents the current in motor 102 from exceeding the demagnetization threshold of rotor 106. In this example, synchronization limits the short circuit current to a maximum peak value of approximately 5.08 amps.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A motor and control for use in a laundering apparatus, said laundering apparatus including a tub having a lid movable by a user between an open position and a closed position and including a lid switch that provides a signal representative of the position of the lid, said motor and control comprising:

a stationary assembly including a winding;

a rotatable assembly in magnetic coupling relation to the stationary assembly;

a power supply link for providing power to the winding, said power supply link having upper and lower rails supplied by a power supply and power switches responsive to a motor control signal for selectively connecting the rails to the winding to energize the winding with a motor current whereby an electromagnetic field is produced for rotating the rotatable assembly, said power switches comprising a set of upper power switches and a set of lower power switches, each of said power switches having a conducting state and a nonconducting state;

a lid detection circuit responsive to the lid position signal for generating a disable signal when the lid is in its open position; and a control circuit for generating the motor control signal to control the power switches, said control circuit being responsive to the disable signal for controlling the power switches so that the lower power switches become conducting and the upper power switches become nonconducting, or vice-versa, thereby de-energizing the winding to disable the motor.

2. The motor and control of claim 1 wherein the lid detection circuit includes a comparator circuit for comparing a level of the lid position signal to a voltage threshold, said lid position signal level being representative of the position of the lid, and wherein the lid detection circuit is responsive to the comparator circuit for generating the disable signal when the lid position signal level is less than the voltage threshold.

3. The motor and control of claim 2 wherein the power supply supplies an ac line voltage to the power supply link, wherein the lid detection circuit includes a timer circuit for timing an interval longer than one cycle of the line voltage, and wherein the control circuit inhibits the disable signal when the lid position signal level is greater than the voltage threshold for the timed interval.

4. The motor and control of claim 1 wherein the control circuit includes a circuit for delaying the lower power switches from becoming conducting in response to the disable signal until after the upper power switches become nonconducting, and vice-versa.

5. The motor and control of claim 1 further comprising a shaft in driving relation with the rotatable assembly for driving a rotatable component of the laundering apparatus.

6. A motor and control comprising:

a stationary assembly including a winding;

a rotatable assembly in magnetic coupling relation to the stationary assembly;

a power supply link for providing power to the winding, said power supply link having upper and lower rails supplied by a power supply and power switches responsive to a motor control signal for selectively connecting the rails to the winding to energize the winding with a motor current whereby an electromagnetic field is produced for rotating the rotatable assembly, said power switches comprising a set of upper power switches and a set of lower power switches, each of said power switches having a conducting state and a nonconducting state, said power supply link including at least one rail capacitor between the upper and lower rails and a rail regulator circuit connected between the upper and lower rails for comparing a rail voltage across the rail capacitor to a voltage threshold, said rail regulator circuit being operable to limit the rail voltage by discharging the rail capacitor when the rail voltage exceeds the voltage threshold;

a disable circuit for selectively generating a disable signal, said disable circuit comprising a rail overvoltage detector circuit for comparing the rail voltage to an overvoltage reference, said rail overvoltage detector circuit providing an overvoltage signal when the rail voltage is greater than the overvoltage reference;

a delay circuit responsive to the overvoltage signal for timing a delay interval, said rail overvoltage detector circuit generating the disable signal as a function of the overvoltage signal after the delay interval is timed; and a control circuit for generating the motor control signal to control the power switches, said control circuit being responsive to the disable signal for controlling the power switches so that the lower power switches become conducting and the upper power switches become nonconducting, or vice-versa, thereby de-energizing the winding to disable the motor.

7. The motor and control of claim 6 wherein the control circuit includes a rail regulator inhibiting circuit responsive to the disable signal for inhibiting the rail regulator circuit from operating when the winding is being de-energized for disabling the motor.

8. A motor and control comprising:

a stationary assembly including a winding;

a rotatable assembly in magnetic coupling relation to the stationary assembly;

a power supply link for providing power to the winding, said power supply link having upper and lower rails supplied by a power supply and power switches responsive to a motor control signal for selectively connecting the rails to the winding to energize the winding with a motor current whereby an electromagnetic field is produced for rotating the rotatable assembly, said power switches comprising a set of upper power switches and a set of lower power switches, each of said power switches having a conducting state and a nonconducting state;

a disable circuit for selectively generating a disable signal;

a current sensing circuit for sensing current in the power supply link;

a current regulation circuit for comparing the sensed current to a regulated current level representative of a desired speed and/or torque of the motor and providing a current regulation signal representative of the comparison, said regulated current level being a peak regulated current level in response to the disabled signal;

a control circuit for generating the motor control signal to control the power switches, said control circuit being responsive to the disable signal and the current regulation signal for controlling the power switches so that the lower power switches become conducting and the upper power switches become nonconducting, or vice-versa, thereby de-energizing the winding to disable the motor and for pulse width modulating the conducting power switches at a duty cycle which is a function of the peak regulated current level thereby regulating circulating current remaining in the motor when the winding is being de-energized for disabling the motor.

9. A motor and control comprising:

a stationary assembly including a winding;

a rotatable assembly in magnetic coupling relation to the stationary assembly;

a power supply link for providing power to the winding, said power supply link having upper and lower rails supplied by a power supply and power switches responsive to a motor control signal for selectively connecting the rails to the winding to energize the winding with a motor current whereby an electromagnetic field is produced for rotating the rotatable assembly, said power switches comprising a set of upper power switches and a set of lower power switches, one of said upper switches and one of said lower power switches being active during each commutation interval of the motor, each of said power switches having a conducting state and a nonconducting state;

a current sensing circuit for sensing current in the power supply link;

a current regulation circuit for comparing the sensed current to a regulated current level representative of a desired speed and/or torque of the motor, said current regulation circuit providing a current regulation signal representative of the comparison, said current regulation circuit including an overcurrent detector circuit for comparing the sensed current to a current threshold greater than the regulated current level, said overcurrent detector circuit providing an overcurrent signal representative of the comparison;

a disable circuit for selectively generating a disable signal; and a control circuit for generating the motor control signal to control the power switches, said control circuit being responsive to the disable signal for controlling the power switches so that the lower power switches become conducting and the upper power switches become nonconducting, or vice-versa, thereby de-energizing the winding to disable the motor and responsive to the overcurrent signal for controlling the power switches so that either the active upper power switch or the active lower power switch is used for pulse width modulating the power provided to the winding when the sensed current is less than the current threshold and both the active upper power switch and the active lower power switch are used for pulse width modulating the power provided to the winding when the sensed current is greater than the current threshold, said control circuit being responsive to the current regulation signal for controlling the power switches to pulse width modulate the power provided to the winding at a duty cycle which is a function of the regulated current level thereby regulating the motor current in the winding to control the speed and/or torque of the motor.

10. The motor and control of claim 9 wherein the pulse width modulated power provided to the winding comprises alternating on and off intervals and wherein the control circuit includes an off timer circuit for determining the duration of the off intervals, said off timer circuit being responsive to the overcurrent signal for increasing the duration of the off intervals when the sensed current is greater than the current threshold.

11. A motor and control comprising:

a stationary assembly including a winding;

a rotatable assembly in magnetic coupling relation to the stationary assembly;

a power supply link for providing power to the winding, said power supply link having upper and lower rails supplied by a power supply and power switches responsive to a motor control signal for selectively connecting the rails to the winding to energize the winding with a motor current whereby an electromagnetic field is produced for rotating the rotatable assembly, said power switches comprising a set of upper power switches and a set of lower power switches, each of said power switches having a conducting state and a nonconducting state;

a rail voltage sensing circuit for sensing a rail voltage between the upper and lower rails of the power supply link, said rail voltage sensing circuit providing a rail voltage signal representative of the sensed rail voltage;

a rail overvoltage detector circuit for comparing the rail voltage signal to an overvoltage reference, said rail overvoltage detector circuit providing an overvoltage signal when the rail voltage signal is greater than the overvoltage reference; and a control circuit for generating the motor control signal to control the power switches, said control circuit being responsive to the overvoltage signal for controlling the power switches so that the lower power switches become conducting and the upper power switches become nonconducting, or vice-versa, thereby de-energizing the winding to disable the motor.

12. The motor and control of claim 11 wherein the control circuit includes a delay circuit responsive to the overvoltage signal for timing a delay interval and wherein the rail overvoltage detector circuit generates the disable signal as a function of the overvoltage signal after the delay interval is timed.

13. A motor and control comprising:

a stationary assembly including a winding;

a rotatable assembly in magnetic coupling relation to the stationary assembly;

a power supply link for providing power to the winding, said sower supply link having upper and lower rails supplied by a power supply and power switches responsive to a motor control signal for selectively connecting the rails to the winding to energize the winding with a motor current whereby an electromagnetic field is produced for rotating the rotatable assembly, said power switches comprising a set of upper power switches and a set of lower power switches, each of said power switches having a conducting state and a nonconducting state;

a rail voltage sensing circuit for sensing a rail voltage between the upper and lower rails of the power supply link, said rail voltage sensing circuit providing a rail voltage signal representative of the sensed rail voltage;

a disable circuit for selectively generating a disable signal;

a rail undervoltage detector circuit for comparing the rail voltage signal to an undervoltage reference, said rail undervoltage detector circuit generating the disable signal when the rail voltage signal is less than the undervoltage reference; and a control circuit for generating the motor control signal to control the power switches, said control circuit being responsive to the disable signal for controlling the power switches so that the lower power switches become conducting and the upper power switches become nonconducting, or vice-versa, thereby de-energizing the winding to disable the motor.

14. A motor and control comprising:

a stationary assembly including a winding;

a rotatable assembly in magnetic coupling relation to the stationary assembly;

a power supply link for providing power to the winding, said power supply link having upper and lower rails supplied by a power supply and power switches responsive to a motor control signal for selectively connecting the rails to the winding to energize the winding with a motor current whereby an electromagnetic field is produced for rotating the rotatable assembly, said power switches comprising a set of upper power switches and a set of lower power switches, each of said power switches having a conducting state and a nonconducting state;

a disable circuit for selectively generating a disable signal;

a position sensing circuit for sensing an angular position of the rotatable assembly relative to the stationary assembly, said position sensing circuit including a direct position sensor and a quadrature position sensor providing direct and quadrature position signals, respectively, approximately 90° (electrical) out of phase with each other, said direct and quadrature position signals being representative of the sensed position of the rotatable assembly; and a control circuit for generating the motor control signal to control the power switches, said control circuit being responsive to the position signals for generating the motor control signal as a function of the sensed position of the rotatable assembly and responsive to the disable signal for controlling the power switches so that the lower power switches become conducting and the upper power switches become nonconducting, or vice-versa, thereby de-energizing the winding to disable the motor.

15. The motor and control of claim 14 wherein the control circuit is responsive to a reverse direction command for changing operation of the motor from a forward mode to a reversing mode, said forward mode being defined by commutation of the winding generally in phase with the direct position signal and said reversing mode being defined by commutation of the winding generally in phase with the quadrature position signal.

16. The motor and control of claim 15 wherein the control circuit includes a speed detector for detecting motor speed and wherein the control circuit is responsive to the reverse direction command for controlling the power switches to turn off the motor current and then to initiate the reversing mode when the detected motor speed falls below a speed threshold.

17. The motor and control of claim 15 wherein the control circuit includes a processor receiving and responsive to the direct and quadrature position signals for detecting transitions in the direct and quadrature position signals, said transitions being indicative of a direction in which the rotatable assembly is rotating.

18. The motor and control of claim 17 wherein the motor operating in the reversing mode produces torque in a forward direction for one portion of a commutation interval and produces torque in a reverse direction for another portion of the commutation interval, said commutation interval in the reversing mode being defined from one transition of the quadrature position signal to a next transition of the quadrature position signal, and wherein the control circuit controls the power switches in the reversing mode to modulate the motor current so that the forward direction torque is less than the reverse direction torque until the rotatable assembly reverses direction.

19. The motor and control of claim 18 wherein the control circuit is responsive to the rotatable assembly reversing direction for returning operation of the motor from the reversing mode to the forward mode.

20. The motor and control of claim 18 wherein the motor current when the motor is producing the forward direction torque is approximately half of the motor current when the motor is producing the reverse direction torque.

21. A motor and control comprising:

a stationary assembly including a winding;

a rotatable assembly in magnetic coupling relation to the stationary assembly;

a power supply link for providing power to the winding, said power supply link having upper and lower rails supplied by a power supply and power switches responsive to a motor control signal for selectively connecting the rails to the winding to energize the winding with a motor current whereby an electromagnetic field is produced for rotating the rotatable assembly, said power switches comprising a set of upper power switches and a set of lower power switches, each of said power switches having a conducting state and a nonconducting state;

a disable circuit for selectively generating a disable signal;

a position sensing circuit for sensing an angular position of the rotatable assembly relative to the stationary assembly, said position sensing circuit providing a position signal representative of the sensed position; and a control circuit for generating the motor control signal to control the power switches, said control circuit being responsive to the disable signal for controlling the power switches so that the lower power switches become conducting and the upper power switches become nonconducting, or vice-versa, thereby de-energizing the winding to disable the motor, and said control circuit including a processor responsive to the position signal for detecting zero crossings of back electromotive force (EMF) of the winding as a function of the sensed position of the rotatable assembly and for estimating subsequent zero crossings of the back EMF as a function of the detected zero crossings, said control circuit generating the motor control signal for controlling the power switches to cause commutation instances to occur after the detected zero crossings as a function of a delay interval $T_d$ defined in microseconds by:

$$T_d = COMPER - ADV$$

where:

COMPER is an elapsed time between two previous commutation instances in microseconds; and ADV is an advance interval which is a function of a desired speed and/or torque of the motor.

22. The motor and control of claim 21 wherein the advance interval ADV is defined in microseconds by:

$$ADV = COMPER \cdot IOUT/K_{ADV}$$

where:

IOUT is a regulated current level representative of the desired speed and/or torque of the motor; and $K_{ADV}$ is a motor dependent constant.

23. The motor and control of claim 22 wherein the value of COMPER is limited when the back EMF of the winding is less than a rail voltage between the upper and lower rails of the power supply link to approximately the elapsed time between two previous commutation instances during which the back EMF and the rail voltage are approximately equal.

24. The motor and control of claim 21 wherein the control circuit generates the motor control signal for controlling the power switches to cause commutation instances to alternately occur after the detected zero crossings by an interval A' and an interval B'.

25. The motor and control of claim 24 wherein a commutation interval between each detected zero crossing and the next estimated zero crossing is alternately defined by (A'+A) and (B'+B) and wherein the intervals A' and B' are defined by:

$$A' = T_d - T_{ofs};$$

and $$B' = T_d + T_{ofs}$$

where:

$T_{ofs}$ is a variable for reducing an asymmetry between adjacent commutation intervals which is defined by (A'+B)−(B'+A).

26. The motor and control of claim 25 wherein the variable $T_{ofs}$, beginning at zero, is incremented if the asymmetry between adjacent commutation intervals is positive and decremented if the asymmetry between adjacent commutation intervals is negative.

27. The motor and control of claim 25 wherein the control circuit includes a memory for storing $T_{ofs}$ and wherein every N commutation intervals the processor updates the stored value of $T_{ofs}$ until the asymmetry between adjacent commutation intervals is zero.

28. A motor and control comprising:

a stationary assembly including a winding;

a rotatable assembly in magnetic coupling relation to the stationary assembly;

a power supply link for providing power to the winding, said power supply link having upper and lower rails supplied by a power supply and power switches responsive to a motor control signal for selectively connecting the rails to the winding to energize the winding with a motor current whereby an electromagnetic field is produced for rotating the rotatable assembly, said power switches comprising a set of upper power switches and a set of lower power switches, each of said power switches having a conducting state and a nonconducting state;

a disable circuit for selectively generating a disable signal;

a processor for generating a steady state estimate of the motor current; and a synchronization circuit responsive to the disable signal for causing the lower power switches to become conducting and the upper power switches to become nonconducting, or vice-versa, when the motor current approximately equals the steady state estimate so that transient currents remaining in the motor are reduced.

29. The motor and control of claim 28 wherein the steady state estimate of the motor current is defined by:

$$I_{shrlpk} = K_e \cdot 30/(V_{pktavg} \cdot L \cdot p)$$

where:

$K_e$ is a motor dependent constant in (peak volts)/RPM;

$V_{pktavg}$ is a measured peak to average back electromotive force of the winding;

L is an inductance of the winding in Henries; and p is a number of poles in the motor.

30. A motor and control comprising:

a stationary assembly including a winding;

a rotatable assembly in magnetic coupling relation to the stationary assembly;

a power supply link for providing power to the winding, said power supply link having upper and lower rails supplied by a power supply and power switches responsive to a motor control signal for selectively connecting the rails to the winding to energize the winding with a motor current whereby an electromagnetic field is produced for rotating the rotatable assembly;

a direct position sensor and a quadrature position sensor for sensing an angular position of the rotatable assembly relative to the stationary assembly, said direct and quadrature position sensors providing direct and quadrature position signals, respectively, approximately 90° (electrical) out of phase with each other, said direct and quadrature position signals being representative of the sensed position of the rotatable assembly;

a control circuit for generating the motor control signal as a function of the sensed position of the rotatable assembly to control the power switches, said control circuit being responsive to a reverse direction command for changing operation of the motor from a forward mode to a reversing mode, said forward mode being defined by commutation of the winding generally in phase with the direct position signal and said reversing mode being defined by commutation of the winding generally in phase with the quadrature position signal.

31. The motor and control of claim 30 wherein the control circuit includes a speed detector for detecting motor speed and wherein the control circuit is responsive to the reverse direction command for controlling the power switches to turn off the motor current and then to initiate the reversing mode when the detected motor speed falls below a speed threshold.

32. The motor and control of claim 30 wherein the control circuit includes a processor receiving and responsive to the direct and quadrature position signals for detecting transitions in the direct and quadrature position signals, said transitions being indicative of a direction in which the rotatable assembly is rotating.

33. The motor and control of claim 32 wherein the motor operating in the reversing mode produces torque in a forward direction for one portion of a commutation interval and produces torque in a reverse direction for another portion of the commutation interval, said commutation interval in the reversing mode being defined from one transition of the quadrature position signal to a next transition of the quadrature position signal, and wherein the control circuit controls the power switches in the reversing mode to modulate the motor current so that the forward direction torque is less than the reverse direction torque until the rotatable assembly reverses direction.

34. The motor and control of claim 33 wherein the control circuit is responsive to the rotatable assembly reversing direction for returning operation of the motor from the reversing mode to the forward mode.

35. The motor and control of claim 33 wherein the motor current when the motor is producing the forward direction torque is approximately half of the motor current when the motor is producing the reverse direction torque.

36. A motor and control comprising:

a stationary assembly including a winding;

a rotatable assembly in magnetic coupling relation to the stationary assembly;

a power supply link for providing power to the winding, said power supply link having upper and lower rails supplied by a power supply and power switches responsive to a motor control signal for selectively connecting the rails to the winding to energize the winding with a motor current whereby an electromagnetic field is produced for rotating the rotatable assembly;

a position sensing circuit for sensing an angular position of the rotatable assembly relative to the stationary assembly, said position sensing circuit providing a position signal representative of the sensed position;

a control circuit responsive to the position signal for generating the motor control signal as a function of the sensed position of the rotatable assembly to control the power switches, said control circuit including a processor responsive to the position signal for estimating zero crossings of back electromotive force (EMF) of the winding as a function of the sensed position of the rotatable assembly, said control circuit generating the motor control signal for controlling the power switches to cause commutation instances to occur in advance of the estimated zero crossings by an advance interval ADV defined in microseconds by:

$$ADV = COMPER \cdot IOUT / K_{ADV}$$

where:

COMPER is an elapsed time between two previous commutation instances in microseconds;

IOUT is a regulated current level representative of a desired speed and/or torque of the motor; and $K_{ADV}$ is a motor dependent constant.

37. The motor and control of claim 36 wherein the value of COMPER is limited when the back EMF of the winding is less than a rail voltage between the upper and lower rails of the power supply link to approximately the elapsed time between two previous commutation instances during which the back EMF and the rail voltage are approximately equal.

38. A motor and control comprising:

a stationary assembly including a winding;

a rotatable assembly in magnetic coupling relation to the stationary assembly;

a power supply link for providing power to the winding, said power supply link having upper and lower rails supplied by a power supply and power switches responsive to a motor control signal for selectively connecting the rails to the winding to energize the winding with a motor current whereby an electromagnetic field is produced for rotating the rotatable assembly;

a position sensing circuit for sensing an angular position of the rotatable assembly relative to the stationary assembly, said position sensing circuit providing a position signal representative of the sensed position;

a control circuit responsive to the position signal for generating the motor control signal as a function of the sensed position of the rotatable assembly to control the power switches, said control circuit including a processor responsive to the position signal for detecting zero crossings of back electromotive force (EMF) of the winding as a function of the sensed position of the rotatable assembly and for estimating subsequent zero crossings of the back EMF as a function of the detected zero crossings, said control circuit generating the motor control signal for controlling the power switches to cause commutation instances to alternately occur after the detected zero crossings by an interval A' and an interval B' as a function of a delay interval $T_d$ defined in microseconds by:

$$T_d = COMPER - ADV$$

where:

COMPER is an elapsed time between two previous commutation instances in microseconds; and ADV is an advance interval which is a function of a desired speed and/or torque of the motor.

39. The motor and control of claim 38 wherein a commutation interval between each detected zero crossing and the next estimated zero crossing is alternately defined by (A'+A) and (B'+B) and wherein the intervals A' and B' are defined by:

$$A' = T_d - T_{ofs};$$

and $$B' = T_d + T_{ofs}$$

where:

$T_{ofs}$ is a variable for reducing an asymmetry between adjacent commutation intervals which is defined by (A'+B)−(B'+A).

40. The motor and control of claim 39 wherein the variable $T_{ofs}$, beginning at zero, is incremented if the asymmetry between adjacent commutation intervals is positive and decremented if the asymmetry between adjacent commutation intervals is negative.

41. The motor and control of claim 39 wherein the control circuit includes a memory for storing $T_{ofs}$ and wherein every N commutation intervals the processor updates the stored value of $T_{ofs}$ until the asymmetry between adjacent commutation intervals is zero.

* * * * *